US006775371B2

(12) United States Patent
Elsey et al.

(10) Patent No.: US 6,775,371 B2
(45) Date of Patent: Aug. 10, 2004

(54) TECHNIQUE FOR EFFECTIVELY PROVIDING CONCIERGE-LIKE SERVICES IN A DIRECTORY ASSISTANCE SYSTEM

(75) Inventors: Nicholas J. Elsey, West Linn, OR (US); Michael T. Samudio, Tigard, OR (US); Timothy A. Timmins, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 0 days.

(21) Appl. No.: 10/201,211

(22) Filed: Jul. 22, 2002

(65) Prior Publication Data

US 2003/0007620 A1 Jan. 9, 2003

Related U.S. Application Data

(63) Continuation-in-part of application No. 09/520,306, filed on Mar. 7, 2000, which is a continuation-in-part of application No. 08/816,921, filed on Mar. 13, 1997, now Pat. No. 6,456,709.

(51) Int. Cl.[7] ............................................... H04M 1/64
(52) U.S. Cl. ............................... 379/218.01; 379/67.1; 379/88.13; 379/93.12; 379/201.01; 379/265.01; 379/266.04; 379/266.07
(58) Field of Search ...................... 379/67.1, 76, 88.13, 379/93.12, 93.23, 114.13, 142.15, 201.01, 207.11, 218.01, 265.01, 265.09, 266.04, 266.07

(56) References Cited

U.S. PATENT DOCUMENTS

| 837,894 A | 12/1906 | Aven |
| 4,696,028 A | 9/1987 | Morganstein et al. |
| 4,817,129 A | 3/1989 | Riskin et al. |
| 4,908,850 A | 3/1990 | Masson et al. |
| 4,922,519 A | 5/1990 | Daudelin |

(List continued on next page.)

Primary Examiner—Allan Hoosain
(74) Attorney, Agent, or Firm—Kaye Scholer LLP

(57) ABSTRACT

Telephone users desiring directory assistance services are connected via standard telephone procedures to a directory assistance provider, such as an operator. An operator provides the destination number and initiates a connection to that number. Once that connection is initiated, the connection is monitored for the occurrence of a predetermined condition, such as a busy signal. If no such condition is detected, the caller proceeds with the call in the normal manner. If, however, such a condition is detected, the caller is automatically transferred to a directory assistance provider for further help. In addition, a pool of operators/agents capable of receiving the request for concierge-like services generate an electronic ticket representing such request. A pool of fulfillment agents capable of receiving the electronic ticket engage in such action as necessary to fulfill the request. The agents are networked to directory assistance and concierge databases and to third-party providers of concierge services to facilitate the process.

32 Claims, 16 Drawing Sheets

U.S. PATENT DOCUMENTS

| | | | |
|---|---|---|---|
| 4,932,042 A | 6/1990 | Baral et al. | |
| 4,959,855 A | 9/1990 | Daudelin | |
| 4,979,206 A * | 12/1990 | Padden et al. | 379/67 |
| 5,056,134 A | 10/1991 | Bauer et al. | |
| 5,063,591 A | 11/1991 | Jodoin | |
| 5,157,718 A | 10/1992 | Kaplan et al. | |
| 5,163,083 A * | 11/1992 | Dowden et al. | 379/88 |
| 5,181,237 A | 1/1993 | Dowden et al. | |
| 5,187,740 A | 2/1993 | Swaim et al. | |
| 5,222,120 A | 6/1993 | McLeod et al. | |
| 5,353,336 A | 10/1994 | Hou et al. | |
| 5,367,561 A * | 11/1994 | Adler et al. | 379/93 |
| 5,414,754 A | 5/1995 | Pugh et al. | |
| 5,418,844 A | 5/1995 | Morrisey et al. | |
| 5,479,488 A | 12/1995 | Lennig et al. | |
| 5,511,111 A | 4/1996 | Serbetcioglu et al. | |
| 5,517,560 A | 5/1996 | Greenspan | |
| 5,555,299 A * | 9/1996 | Maloney et al. | 379/212 |
| 5,689,547 A | 11/1997 | Molne | |
| 5,737,700 A | 4/1998 | Cox et al. | |
| 5,757,904 A * | 5/1998 | Anderson | 379/265 |
| 5,768,513 A | 6/1998 | Kuthyar | |
| 5,797,092 A | 8/1998 | Cox et al. | |
| 5,797,126 A | 8/1998 | Helbling et al. | |
| 5,848,131 A * | 12/1998 | Shaffer et al. | 379/88 |
| 5,850,433 A * | 12/1998 | Rondeau | 379/201 |
| 5,897,620 A | 4/1999 | Walker et al. | |
| 5,943,417 A | 8/1999 | Cox et al. | |
| 5,948,040 A | 9/1999 | DeLorme et al. | |
| 5,983,200 A | 11/1999 | Slotznick | |
| 6,094,640 A | 7/2000 | Goheen | |
| 6,134,530 A | 10/2000 | Bunting et al. | |
| 6,205,436 B1 | 3/2001 | Rosen | |
| 6,459,782 B1 * | 10/2002 | Bedrosian et al. | 379/201.08 |

* cited by examiner

100

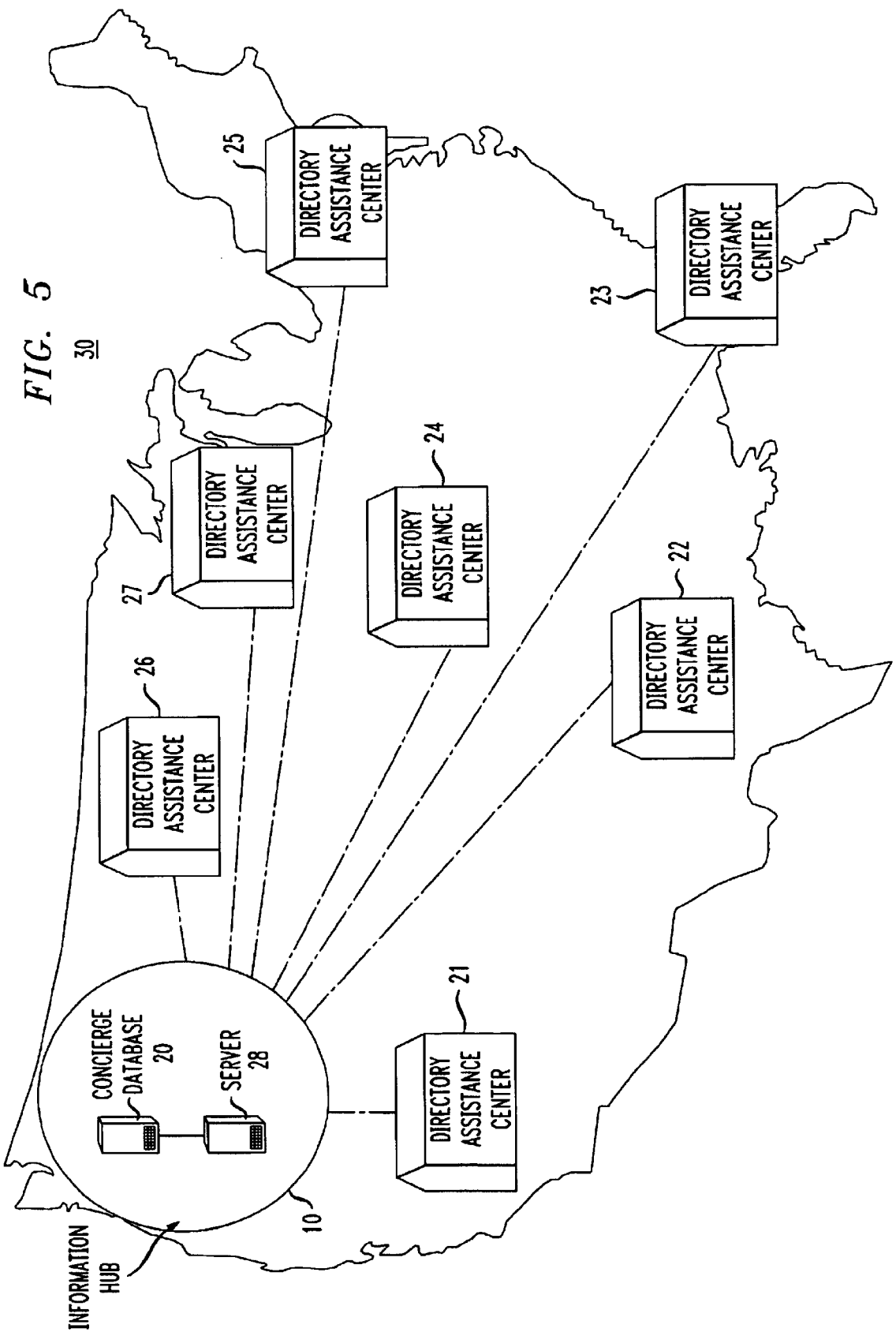

FIG. 6

Name for Reservation [Sharkey, James] ⓘ Caller,MIN [619 804 1586] ⓘ Caller ID [PB] ⓘ

First Choice Restaurant Name ⓘ [Beach House Restaurant, The] Phone ⓘ [760 753 13] Address ⓘ [2530 S Coast Highway 101] City ⓘ [Cardiff By The Sea] State ⓘ [CA]

Second Choice Restaurant Name ⓘ [Vigiluccis] Phone ⓘ [760 634 23] Address ⓘ [1933 San Elijo Av] City ⓘ [Cardiff By The Sea] State ⓘ [CA]

Date of Reservation [Thursday March 4, 1999] ⓘ Number in party [2] ⓘ

Preferred Time [8pm] ⓘ If unavailable then from [7:30pm] to [9:30pm] ⓘ

Contact Name [Sharkey, James] ⓘ Method [Phone] ⓘ Number [619 653 9642] ⓘ

Contact Name [Walker, Jenny] ⓘ Method [Phone] ⓘ Number [619 896 3276]

FIG. 7

TeleConcierge Search Form For San Diego

| Dialed | Last Dialed | Status | Restrictions |
|---|---|---|---|
| | | | |

| Next Action Date/Time | Reservation Date/Time | Name | Restaurant | Status |
|---|---|---|---|---|
| 41 03/06/1999 03:00 AM | 03/06/1999 12:00 PM | fran | Beach House Restaurant The | Requires Fulfillment |

Create a new Ticket

If the list above does not contain the reservation request that you are looking for, you can enter additional search parameters and hit the 'Search' button to search all the reservation requests again.

Restaurant

Restaurant name

Search

Street    City

FIG. 9

| Dialed | Last Dialed | Status | Restriction |
|---|---|---|---|

| Time stamp | Last Action | Result | Notes |
|---|---|---|---|
| 03/06/1999 02:21 PM | Created | NA | |
| 03/06/1999 03:17 PM | Called Restaurant 1 | Busy | |

Viewed ▼   Successful ▼

Current Ticket Status
Requires Fulfillment
Next Action Date  AUTO
Next Action Time  AUTO Record Event Go back to the Search Screen The ticket status field indicates the current action that needs to be taken for this reservation request. Use the record event button to note the action just carried. The date and time fields are used to determine when the next action should be carried out for this request.

| Street | City |
|---|---|

FIG. 10

| Dialed | Last Dialed | Status | Restriction |
|---|---|---|---|
|  |  |  |  |

| Time stamp | Last Action | Result | Notes |
|---|---|---|---|
| 03/06/1999 04:08 PM | Created | NA |  |
| 03/06/1999 04:20 PM | Called Restaurant 1 | Successful | Reservation was available for 8:30pm, 1/2 hour later than requested. They will reserve a private booth. Talked to Jim. |
| Viewed | | Successful | |

Current Ticket Status
Requires Customer Notification
Next Action Date  AUTO
Next Action Time  AUTO The ticket status field indicates the current action that needs to be taken for this reservation request. Use the record event button to note the action just carried. The date and time fields are used to determine when the next action should be carried out for this request.

| Street | City |
|---|---|

TECHNIQUE FOR EFFECTIVELY PROVIDING CONCIERGE-LIKE SERVICES IN A DIRECTORY ASSISTANCE SYSTEM

The present application is a continuation-in-part of U.S. application Ser. No. 08/816,921 filed on Mar. 13, 1997, now U.S. Pat. No. 6,456,709 and U.S. application Ser. No. 09/520,306 filed on Mar. 7, 2000.

FIELD OF THE INVENTION

The invention relates to a communications system and method, and more particularly to a system and method for providing a directory assistance service including, e.g., provision of information concerning goods and services, and locating, reserving and procuring/purchasing such goods and services, in response to a customer's inquiry.

BACKGROUND OF THE INVENTION

Concierge services are typically provided by hotels. The method generally employed is where a hotel guest, using the hotel room telephone, places a call to the hotel reception and asks to speak to the hotel concierge. The guest is connected to the concierge who then listens to the request of the hotel guest, such as a request for a restaurant reservation, and notes any preferences, such as the guest's preference for outdoor dining. The concierge then suggests a service, an event or restaurant in accordance with the guest's desires and preferences. The suggestion is often based on the concierge's personal knowledge in the field, and/or by consulting a listing book or directory. Should the suggestion be satisfactory, the concierge will make the necessary reservations and inform the hotel guest of the reservation details.

Concierge services are especially useful for a visitor who is unfamiliar with an area's services, eating establishments or upcoming events. The problem with such a service is that it is restricted to the guests at a specific hotel only. The concierge's suggestions can also often be biased, erratic or based on limited listing or directory information. In addition to the above, the hotel guest may also need to write down the reservation details, obtain directions and arrange transportation.

Furthermore, the whole process can be slow, as access to large listings are often manually searched by the concierge. The concierge may also be limited by the type of search he/she can perform. He may not be able to search for multiple preferences simultaneously, such as for example an outdoor, non-smoking, vegetarian restaurant, in a specific area. In addition, the concierge may only be familiar with restaurants in a particular area and therefore may be of little use to a hotel guest who is departing that day for another city.

Directory Assistance

Telephone calls from one party to another are made through telephone networks, with telephone switches and private branch exchanges ("PBX") employed as necessary in order to connect networks and customers. Customers frequently make use of directory assistance systems to reach their desired parties. When using a directory assistance system (sometimes referred to as a "directory assistance platform"), a caller first dials the appropriate telephone number or access code. Telephone users usually access a directory assistance system through a carrier switching center. Once connected to a directory assistance provider, such as a live operator or a voice server, the caller identifies the party whose telephone number is desired. The correct number is located and may be reported to (by voice or computer-generated speech), and/or dialed for, the caller. It is increasingly common for directory assistance systems to connect the caller to the caller's desired number in addition to, or in place of, simply providing the number to the caller. This is particularly helpful to callers using cellular or other forms of wireless telephones, who may be engaged in other activities at the same time and therefore unable to take note of the number as it is recited. Typically, once the caller has been given the number and/or the number is dialed for the caller, the caller's connection through the directory assistance platform is terminated.

Termination of the connection through the directory assistance platform has a number of disadvantages. For example, if the caller is given or connected to an incorrect telephone number, the caller must contact the directory assistance system again or inquire elsewhere to obtain the correct number. This naturally requires additional action and expense on the caller's part. Moreover, reconnection to the directory assistance platform requires reallocation of directory assistance resources to the customer call. In view of the previous connection through the directory assistance platform, reconnection and reallocation is unnecessary, time consuming, and under some circumstances, wasteful. Similarly, even if the telephone number to which the caller is connected is correct, the line may be busy, there may be no answer, the destination party's telephone network may be inoperable, etc. In such circumstances, the caller often will want to contact a different party, again requiring the aid of the directory assistance system. Requiring separate and repeated connections to a directory assistance platform incurs added monetary expense on the caller's party, because directory assistance platforms typically charge a fee for each separate connection. Conversely, if a caller's connection is maintained to the directory assistance platform, multiple actions may be taken to assist the caller without necessarily incurring such additional fees.

Prior art directory assistance systems suffer from a further disadvantage in that they typically lack dedicated resources for monitoring telephone connections to calling or called parties. For example, in U.S. Pat. No. 5,414,754, one tone detecting device monitors up to 1,344 connections by using a multiplexer. The period of time for which each connection is monitored is critical to this method of operation. To service so many connections on an equal timesharing basis, the device cannot monitor one particular connection for more than a very short period of time (illustratively, on the order of milliseconds) before switching to and monitoring others. If the time period is too short, this method has the deleterious effect of requiring a party to press a key for an extended period of time—long enough to ensure that the monitoring digital signal processor ("DSP"), perhaps a dual-tone multi-frequency ("DTMF") receiver, cycles back to the party's connection in time to detect the keypress—or risk the possibility that the DSP will miss the party's keypress. Another disadvantage to this method is that normal voice energy, or transient signals such as from interference or crosstalk, may cause a DSP that is monitoring the connection to mistakenly report that a party pressed a key. This disadvantage is even more pronounced in a wireless environment, where the bit error rate or degraded audio quality of the connection often precludes the receipt of a continuous tone.

Another disadvantage in prior directory assistance systems is the inability to restrict the caller's use of the directory assistance system to connect to specified parties. For example, the party paying for a caller's wireless telephone service may wish to restrict the caller from making any long-distance calls, or to limit the caller to calls to other parties within one organization, etc. Without the ability to limit the caller's connections through the directory assistance system, the caller could circumvent the paying party's restrictions by having the directory assistance system complete the call for him or her.

Traditionally, directory assistance has focused on providing telephone number directory information only. Typically, a directory assistance operator receives a request from a caller for the telephone number of a desired party. The operator locates the required number from a listing directory and may either give the number to the caller or connect the caller to the desired party.

Each year, a growing number of people spend a significant amount of time traveling for business or pleasure. Mobile communication and portable computers have created an opportunity for these people to conduct business and communicate while on the move. Wireless telephones have become a standard business tool in this environment. Wireless telephone users may find current directory assistance services inconvenient or difficult to use. Such users are usually away from their general work environments (for example, traveling in a vehicle), and thus may not be able to remember, or make a note of a desired number. Callers who would normally be able to call upon secretaries or personal assistants at their offices, may not have access to such assistance when traveling. The wireless telephone caller thus needs a comparable service to that which they would experience in an office environment. While improvements to telephone directory assistance have been made over the years, such systems do not fully address the needs of wireless telephone users.

The present assignee has redressed certain of the above-mentioned difficulties by providing directory assistance services that eliminate the need to make notes of the desired number, or undertake a redialing exercise as well as by providing verbal driving directions. The present assignee has also established a country-wide network of directory assistance or call centers that are able to provide its customers with nationwide directory assistance.

SUMMARY OF THE INVENTION

However, in today's directory assistance environments, operator resources are primarily focused on providing telephone number directory assistance. Having an operator respond to a customer's request for concierge-type services would be expected to introduce delays and inefficiencies into a directory assistance system. Moreover, the information infrastructure to allow operators to provide concierge-type services in a timely and efficient manner is not generally available in the current directory assistance environment.

Accordingly, there is a need in the art to provide a method and apparatus by which a caller can, for the duration of a telephone call (i.e., until the calling telephone disconnects from the directory assistance platform), maintain his or her connection to the directory assistance platform and repeatedly receive directory assistance in a variety of forms with minimal or no action on his or her part. There is also a need in the art for means and an apparatus for allocating a monitoring resource, such as a DSP, to a minimal number of telephonic connections. In addition, there is a need for means and an apparatus for verifying a caller's authorization to connect to a requested destination party through a directory assistance platform.

There is also a need for a nationwide telephonic system that is able to efficiently and effectively receive and respond to requests for concierge-type services from calling customers traveling throughout the country. The system should be able to respond to requests regardless of the locale of the customer or the geographical destination of the request.

In view of the above disadvantages of the related art, it is an object of the present invention to provide a method and apparatus for maintaining a telephonic connection for the duration of a telephone call through a directory assistance platform (i.e., until the calling telephone disconnects from the platform) and automatically reconnecting a directory assistance-routed caller to a directory assistance provider.

It is a further object of the present invention to detect, during a call to a customer's destination party, a telephone network communication problem that causes the call to be unsuccessful, and to connect the caller, with substantially no further action on his or her part, to a live operator for further assistance.

It is another object of the invention to detect a ring-no-answer condition while attempting a call to a customer's destination party, and, upon such detection, to maintain the connection attempt and present the caller with a menu of directory assistance service options, including the option to continue monitoring the ring tone.

It is a further object of the invention to detect a busy signal while attempting a call to a customer's destination party, and, upon such detection, to terminate the connection attempt and present the caller with a menu of directory assistance service options, including the option to re-dial the same number.

It is also an object of the invention to provide a method and apparatus for providing directory assistance services, such as connecting customers to directory assistance providers, allowing repeated directory assistance requests from each customer, searching for information to satisfy directory assistance requests, providing such information to customers, and connecting customers to their desired destination parties, as well as enhanced directory assistance services, e.g., recording messages from customers for delivery to destination parties and allowing destination parties, upon delivery of a recorded message, to return the customer's call with minimal action by the destination party.

It is a further object of the invention to verify a customer's authorization to complete calls through a directory assistance system. To enable such verification, along with the customer's call, data concerning the calling telephone number and the location from which the call originated is also received. Based upon the caller's identity and stored information concerning restrictions on the customer's calling authority, the caller's authorization for connecting to desired destination parties can then be verified.

It is a still further object of the invention to provide a directory assistance customer with numerous opportunities to request, with minimal action on the customer's part, the directory assistance system to report the desired destination telephone number.

It is also an object of the invention to provide a directory assistance customer with the customer's destination telephone number via the customer's alphanumeric pager.

It is a still further object of the invention to implement the above objects for callers using wireless telephones.

In accordance with the present invention, a directory assistance system is provided that includes a telephone switch or PBX for receiving, establishing, routing, and connecting telephone calls, plus telephone operators, communication links to physically connect the directory assistance system components, and one or more computers, including at least one voice server, to perform a variety of directory assistance functions (e.g., maintain and search databases containing telephone numbers, billing information, call information, etc.; store and execute instructions relating to the operation of the switch or PBX; provide automated voice services and operator functions). Providing access to and from the telephone switch are external communication links that support standard T1, Common Channel Signalling System 7 ("CCSS7"), or Integrated Digital Services Network ("ISDN") communications.

Calls into the directory assistance system and connections from the system to a caller's destination number are made over external communication links. Telephone connections over the communication links are monitored to detect keypresses and connection status conditions (e.g., busy signal, dial tone). For example, outbound connections to destination parties are monitored by call progress analyzers ("CPA") to determine if an attempted call is unsuccessful (e.g., a busy signal is detected); once applied, CPAs are allocated to the outbound connection for a period of time sufficient in length (illustratively determined by a specified number of rings of the destination telephone) to determine the success or failure of the connection attempt.

The directory assistance system does not drop its connection to, and involvement in, a calling party's connection as soon as it initiates a new call leg (i.e., an outbound call to a destination telephone). Rather, the directory assistance system maintains contact, ready to provide further assistance from a directory assistance operator or a voice server until the calling party disconnects from the directory assistance platform. By remaining in the call flow, a directory assistance system according to this invention is able to provide much faster response to customers' subsequent assistance needs than was heretofore available, which is of particular value to wireless customers who may be distracted by other events. In previous directory assistance systems, in which the system would terminate its involvement after the customer was given its desired telephone number or the directory assistance provider initiated a call attempt to the desired party, the customer was required to reconnect to the directory assistance system if additional assistance was desired.

In a directory assistance system according to the present invention, incoming directory assistance request calls are received by a telephone switch, which is controlled by a switch host computer, via an inbound member of the external communication links and routed to a directory assistance provider. The directory assistance provider may be either a live operator or a voice server that provides automated directory assistance. The switch host computer stores and updates information concerning the status of each active directory assistance call. In addition, a call record is created on a system server to store, for billing purposes, the history of the customer's call. After receiving a request from the caller, the directory assistance provider locates and retrieves the telephone number of the caller's desired destination party by searching directory assistance information stored on system servers. An outbound member of the communication links is seized in order to connect the caller to his or her party, and the destination telephone number is dialed over that outbound member. A dual-tone multi-frequency ("DTMF") receiver is applied to the inbound member to detect customer keypresses, which may represent pre-specified directory assistance requests. A call progress analyzer ("CPA") is applied to the outbound member for a period of time to monitor the member for any one of several pre-determined telephone call connection status conditions that indicate an unsuccessful call attempt. Upon detection of such a connection status condition, or when the called party disconnects, the caller is redirected to a directory assistance provider for further assistance.

The present invention is also directed to providing a calling party with telephonic concierge-type services. The concierge service is intended for use by, but not limited to, wireless telephone subscribers. The service encompasses a wide range of concierge-type services such as for example a telephonic restaurant guide and reservation service, ordering specific services such as flowers or food delivery, arranging transportation, accessing entertainment guides, an event ticketing and reservation service, a hotel reservation and availability service as well as a travel or flight reservation and ticketing services.

According to a preferred embodiment of the present invention, the system includes a nationwide wide area network (WAN) connecting a plurality of directory assistance centers to a server and directory listing database located in an information hub. Communication channels connect calling customers to operators in the directory assistance center. A computer, preferably web-based, interface allows the operator to interrogate the calling customer for information regarding a request for concierge services. Various databases in the system facilitate the generation of the request. Upon completion of the request (called a "ticket"), the ticket is submitted over the WAN. The server sends the ticket to a fulfillment agent in a directory assistance center proximate to the concierge-type service request. A computer, preferably web-based, interface directs the fulfillment agent through the various actions necessary to fill the request. Communication channels, which allow the fulfillment agents to rapidly and easily connect to the various establishments desired by the calling customers, facilitate the filling of the requests and the notification of the calling customer of the filled request.

The method according to a preferred embodiment of the invention is illustrated by the following example. A caller dials and is connected to an enhanced directory assistance service. The caller is informed about the concierge service by a recorded message or by an operator. Alternatively, the caller may already be aware of the concierge service. The operator then obtains a request from the caller. Such a request may either be a request for listing information, such as for example a request for all vegetarian restaurants in a particular area, or the caller may immediately request a reservation, at for example the caller's favorite restaurant. The operator then obtains the caller's details and inputs these details into a computer database. Such details may include the caller's contact details, dietary preferences, desired restaurant location, type of credit card to be used, restaurant views, etc. The operator then looks up listing information from another computer database, based on the caller details, to produce a desired output such as a list of vegetarian restaurants in a specific suburb. A fulfillment agent attempts to contact the restaurant to make the reservation. Finally, the caller is notified whether the reservation was in fact made or not, and any reservation details, if applicable.

In a preferred embodiment, the reservation process is undertaken by a fulfillment agent who exclusively attends to such requests, thus allowing the operator to attend to other tasks. In an alternative embodiment, the operator who receives the request for concierge services may attend to the request.

BRIEF DESCRIPTION OF THE DRAWINGS

These and other features, aspects, and advantages of the present invention will become more readily apparent from the following detailed description, which should be read in conjunction with the accompanying drawings, in which:

FIG. 5 is a telephonic system according to a preferred embodiment including a wide area network;

FIG. 6 illustrates a first graphical user interface of the present invention;

FIG. 7 illustrates a second graphical user interface of the present invention;

FIG. 9 illustrates a fourth graphical user interface of the present invention;

FIG. 10 illustrates a fifth graphical user interface of the present invention;

DETAILED DESCRIPTION

Figure 1:
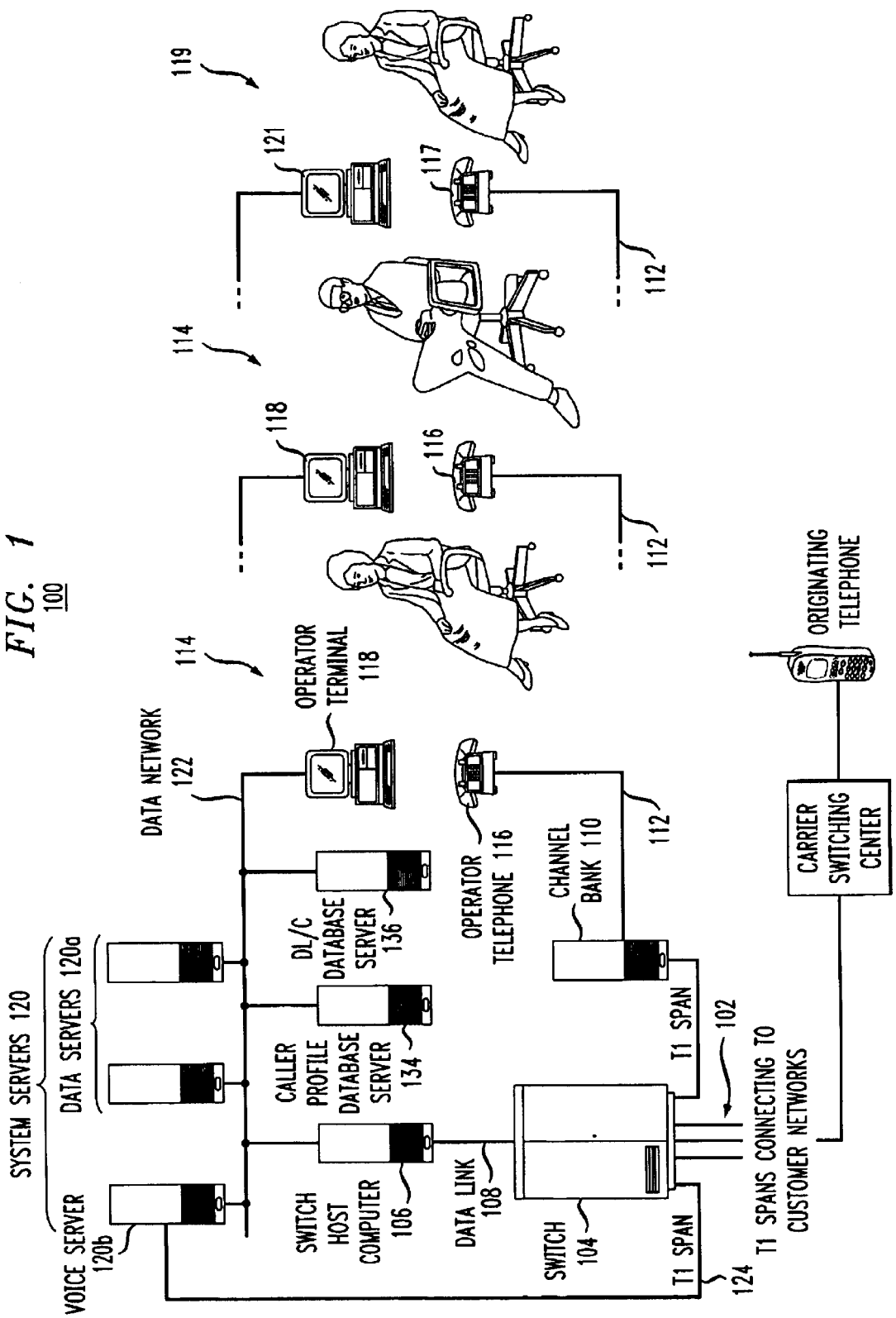
FIG. 1 depicts the components of a directory assistance system according to the invention.

The following embodiments will be described in the context of a private telephone switch connected via conventional T1 communication links to customers using wireless telephones. Those skilled in the art, however, will recognize that the disclosed methods and structures are readily adaptable for broader applications. Note that whenever the same reference numeral is repeated with respect to different figures, it refers to the corresponding structure in each figure.

With reference to FIG. 1, a directory assistance system 100 according to an exemplary embodiment of the invention is depicted. One or more external communication links 102 connect directory assistance system 100 to customers and customer telephone networks. (The T1 carrier is the most commonly used digital line in the United States, Canada, and Japan. In these countries, it carries 24 pulse code modulation (PCM) signals using time-division multiplexing at an overall rate of 1.544 megabits per second. T1 lines use copper wire and span distances within and between major metropolitan areas. It should be appreciated that other systems may also be used.) Communication links 102 connect to telephone switch 104, which is connected to switch host computer 106 via switch data link 108. In an alternative embodiment, switch host computer 106 is coterminous with telephone switch 104.

Telephone switch 104 (also referred to herein as a "switching matrix platform") is attached via a T1 communication link to channel bank 110, and from there connects to operator channel 112 and a plurality of operator and fulfilment agent telephones 116 and 117 respectively. Operator telephones are located at each of one or more operator positions (represented by the numeral 114 in FIG. 1), and fulfilment agent telephones are located at each of one or more fulfilment agent positions (represented by the numeral 119 in FIG. 1). Using operator data terminal 118, a live operator at operator position 114 accesses one or more system servers 120, which are interconnected via data network 122. Switch host computer 106 is also connected to data network 122. Finally, switch 104 is connected to one or more voice servers, which are described below. Each connection to a voice server employs a T1 voice server link (a first voice server link 124 is shown in FIG. 1).

The data network 122 may, but not necessarily, also further connect to a directory listing/concierge (DL/C) database server 136 and a caller profile database server 134. The caller profile database server 134 stores detailed information about a subscriber. Such details may include the subscriber's name, contact details, preferences, dietary requirements, likes and dislikes, past logged activities, etc. The DL/C database server 136 may contain directory listing information on restaurants, events, accommodation, transportation, travel information and booking, stock prices, weather and other services such as grocery or flower delivery, etc.

In one embodiment, the voice server 120b, data server 120a, and switch host computer 106 have redundant systems (not shown), which can operate as either back-up systems in the event of primary system failure, or provide load-sharing in either a master-slave or a peer-to-peer relationship with the primary system.

As stated above, communication links 102 provide telephone connections to directory assistance system 100 for incoming directory assistance calls and also provide access to external telephone networks over which outgoing calls are placed. An incoming call is received via inbound channel 102a (shown in FIG. 2) and an outgoing call is placed over outbound channel 102b (shown in FIG. 2). There is generally one outbound channel 102b for every inbound channel 102a, so that for every call into directory assistance system 100 there is an outbound channel available to reach the caller's desired party or parties. Communication links 102 may, in an illustrative embodiment, be comprised of one or more T1 communication spans which are known in the art. In such an embodiment, each individual call over a T1 span, whether into or out of telephone switch 104, utilizes one of the 24 individual channels into which a T1 span is segmented, each channel providing two-way communications.

Figure 2:
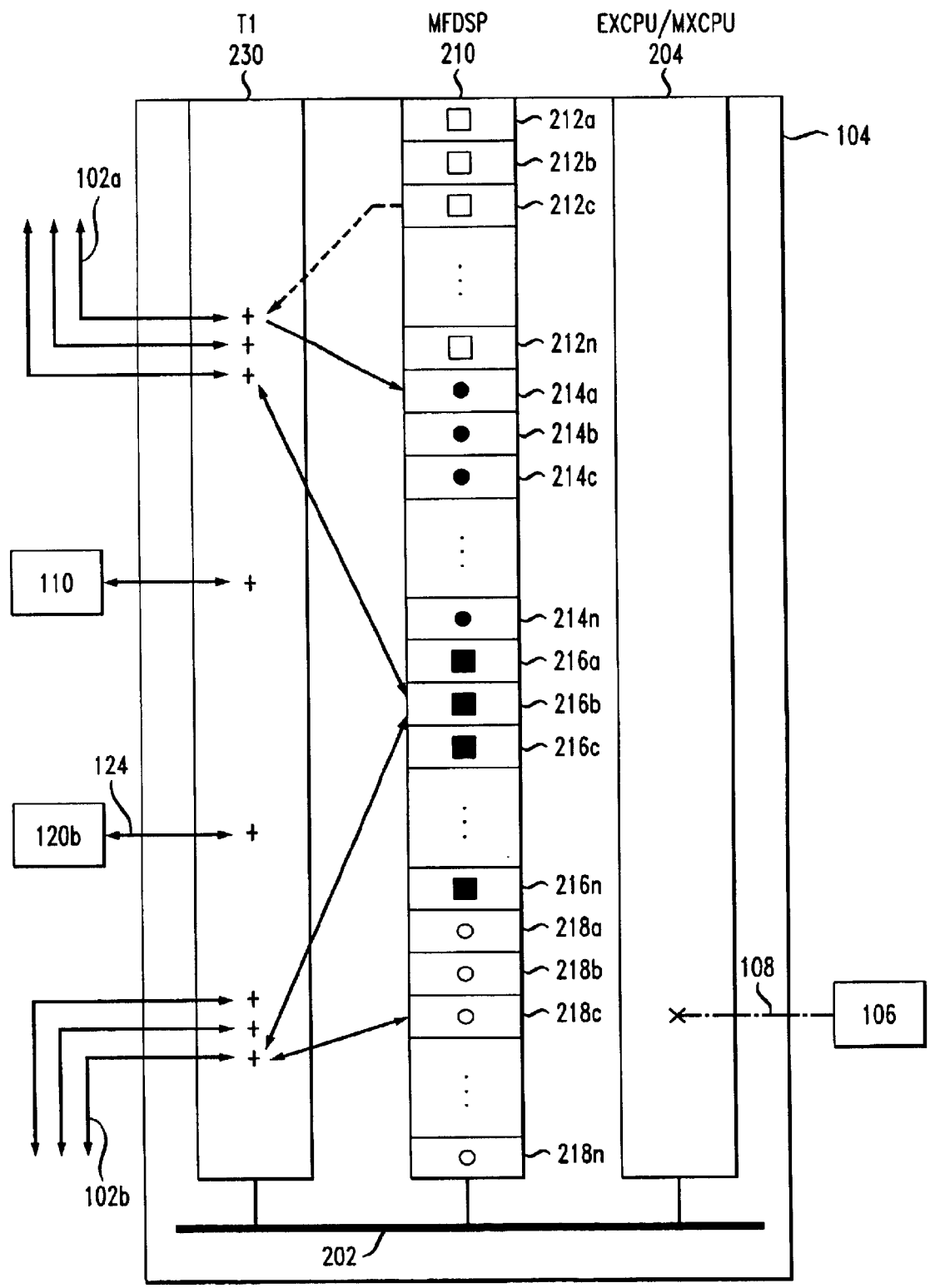
FIG. 2 provides a detailed view of a telephone switch used in an embodiment of the invention.

Telephone switch 104 is now described in further detail with reference to FIG. 2. Operation of telephone switch 104 is governed by computer-readable instructions stored and executed on switch host computer 106. In one embodiment of the invention, telephone switch 104 is an Excel LNX 2000 and switch data link 108 is a 38.4 kb serial link; in another embodiment, switch data link 108 is an Ethernet link.

Telephone switch 104 includes expandable central processing unit ("EXCPU") 204 and/or matrix central processing unit ("MXCPU") 204. EXCPU/MXCPU 204 serves as an interface for telephone switch 104 to switch host computer 106 (via switch data link 108).

EXCPU/MXCPU 204 and other components of telephone switch 104 communicate through shared communication path 202, commonly called a "midplane." In the currently-described embodiment, midplane 202 utilizes a time division multiplexing ("TDM") method of sharing a common pathway. Thus, a plurality of data and/or voice streams can be interlaced onto the single path, separated by time.

Another board-level component of telephone switch 104 is multi-frequency digital signal processor ("MFDSP") unit 210, which includes four single in-line memory module ("SIMM") packagings. Each SIMM packaging is comprised of four DSP arrays. Each DSP array is composed of multiple, illustratively sixteen, programmable DSPs. The DSPs can be programmed or reprogrammed to function as, among other things, call progress analyzers ("CPA"), call progress generators ("CPG"), multi-frequency ("MF") receivers or transmitters, dual-tone multi-frequency ("DTMF") receivers or transmitters, or conference units, depending upon the demand placed on directory assistance system 100 and telephone switch 104 for each corresponding function.

CPAs (represented by the numeral 218 in FIG. 2) are sensitive to, and capable of identifying, telephone connection status conditions and signals including ring tone, busy, reorder, PBX intercept, SIT intercept, vacant code, reorder-SIT, no circuit LEC, reorder-carrier, no circuit-carrier, dial tone, continuous on tone, and silence. In an exemplary embodiment of the invention, one CPA will monitor only one outbound channel 102b at a time. In other embodiments of the invention, one CPA may be applied to more than one outbound channel. However, to ensure that connection status conditions are properly detected, the number of outbound channels monitored by one CPA should be kept to a minimum (i.e., no more than four). In still other embodiments of the invention, two or more DSPs may be applied to a single outbound channel.

CPGs (represented by the numeral 212 in FIG. 2) generate tones to customers connected to directory assistance system 100, such as the ringback tone customers hear when they are routed to an operator.

DTMF receivers (represented by the numeral 214 in FIG. 2) listen for DTMF tones generated by customers' telephones, such as when a customer presses a telephone button. DTMF receivers are capable of detecting and identifying which button was pressed (i.e., the numbers 0–9 or the characters "*" or "#") and passing that information to switch host computer 106 for appropriate action. DTMF receivers are assigned to monitor inbound channels for a configurable period of time, illustratively, from the time of a caller's initial connection to telephone switch 104 to the time the caller disconnects, including the duration of all outbound call legs made on the caller's behalf. Once applied to an inbound channel, a DTMF receiver allows telephone switch 104 to detect the press of a telephone button, perhaps done in order to activate tone-triggered return transfer as described in U.S. Pat. No. 5,737,700, which is incorporated herein by reference, or another feature of directory assistance system 100.

Conference units (represented by the numeral 216 in FIG. 2) enable telephone switch 104 to connect two or more voice paths in a balanced manner, thereby providing the necessary voice connections between calling parties, called parties, and directory assistance providers.

In the presently-described embodiment, each DSP array provides multiple instances of the function for which it is programmed, the exact number depending upon the specific function. For example, each DSP array programmed to provide CPA, CPG, or DTMF receiver functions provides sixteen instances of the chosen function. In other words, a DSP array programmed to provide call progress analyzer functions will contain sixteen separately and independently functional and controllable CPAs. A DSP array programmed to provide conference unit functions, however, provides only four instances of such function. The programmable DSPs on MFDSP unit 210 are managed by switch host computer 106 via EXCPU/MXCPU 204, which keeps track of which DSPs are available and which are allocated.

An additional board-level component of telephone switch 104 is T1 interface unit 230. Switch 104 contains one or more T1 interface units; each unit provides connections to eight T1 (1.544 Mb/sec) spans, each of which is comprised of 24 channels, thus providing 192 64 kb voice channels per T1 interface unit. In FIG. 2, T1 interface 230 dedicates twelve channels on each of six of the eight spans to incoming calls and the other twelve to outgoing calls. The seventh T1 span serves as voice server link 124, and the eighth functions as a link to channel bank 110 and operator channel 112. Voice server link 124 and operator channel 112 are used to connect directory assistance callers to a voice server or a live operator, respectively.

It will be recognized by one skilled in the art that multiple instances of telephone switch 104 may be incorporated into a telephone network or directory assistance system 100 without exceeding the scope of this invention.

In the preferred embodiment, the switching matrix platform (or switch 104) supports digital T1 telephone circuits and includes digital signal processing circuitry which provides the requisite conference capability (described below), SS7 message generation/detection capabilities, and dual tone multi-frequency (DTMF) and multi-frequency (MF) tone generation/detection capabilities. With respect to the SS7 functionality, the switching matrix platform acts as a signaling node, also known as a service switching point.

Switch host computer 106 stores and executes computer-readable instructions for purposes of, among others, configuring and operating telephone switch 104 and directing the transfer of calls through switch 104. It also directs the playback of recorded messages to callers connected to directory assistance system 100. Pre-recorded greeting and closing messages played for callers are recorded in the voice of the operator to whom the caller will be, or was, connected. Switch host computer 106 directs the playback of the appropriate message by identifying the operator and the inbound channel 102a the caller is connected to and specifying the message to be played.

Further, switch host computer 106 maintains call data for each directory assistance call connected to directory assistance system 100. The call data stored on the host computer consists of the most recent assistance request received from each caller, and includes one or more of: the calling telephone number, the date and time of the caller's connection to directory assistance system 100, the T1 span and channel the caller is connected to, the caller's desired destination telephone number, the status of the caller's previous directory assistance request, which operator assisted the caller, etc. Additional call data is stored on system servers 120, as described below. The call data stored on switch host computer 106 and system servers 120 are provided to directory assistance providers when a caller makes multiple directory assistance requests in one call to directory assistance system 100. By considering the collected call data, such as the information that was provided to a caller in a previous request, a directory assistance provider can tailor subsequent assistance to be more effective.

Switch host computer 106 also directs the transfer of information between itself and system servers 120 (via data network 122) as well as between system servers 120 and switch 104 and operator position 114/fulfilment agent position 119 (via channel bank 110 and operator channel 112).

Operator position 114 includes means by which a live operator receives calls, determines caller's informational needs, searches for and retrieves information from system servers 120, provides information to callers, and initiates outgoing calls. In an exemplary embodiment of the invention, an operator at operator position 114 is provided with a telephone headset 116 for interacting with callers, and data terminal 118, connected to data network 122, for interacting with system servers 120.

Each operator and fulfillment agent is equipped with a terminal 118 and 121 that includes a monitor and keyboard with associated dialing pad. The operator terminals are coupled over a data network 122 to a data server 120a, allowing an operator to access the data in data server 120a through the operator terminals 118 and fulfillment agent terminals 121.

System servers 120, which are interconnected via data network 122, include one or more data servers 120a which provide and manage data services within directory assistance system 100. Data servers 120a maintain databases containing telephone and business directories, billing information, and other information in computer-readable form to be searched by operators in response to callers' requests. As introduced above, data servers 120a also store call data for later retrieval by directory assistance providers furnishing subsequent assistance to a caller. The call data stored on data servers 120a illustratively include how and where a directory assistance provider searched for information to satisfy a customer request, the information retrieved by the assistance provider, how that information was displayed for the assistance provider, and the form in which it was communicated to the caller. Unlike switch host computer 106, data servers 120a save call data concerning all requests made by a caller during one call to directory assistance system 100, not just the most recent request, but only for a predetermined period of time (illustratively, one hour).

Billing information is stored in the form of call records, which are created for each customer call into directory assistance system 100. They contain data such as the caller's telephone number, the date and time of the caller's connection to directory assistance system 100, the dates and times of attempted connections to destination parties, the duration of each call leg, etc. One or more call records are created for recording events occurring during a directory assistance call, and are closed when the customer disconnects from directory assistance system 100.

The software used to create and manipulate the databases on data servers 120a is known in the art of computer software and allows directory assistance providers to search the databases by name, address, type of goods or services, geographical region, etc. In FIG. 1, switch host computer 106 and data servers 120a are depicted as distinct entities; in an alternative embodiment they are coterminous.

System servers 120 also include one or more voice servers (a first voice server 120b is shown in FIG. 1) that provide, in alternative embodiments of the invention, all or a subset of the operator functions provided by a live operator at operator position 114. For example, voice servers store and deliver messages that live operators would otherwise be required to frequently repeat for callers, such as greetings, closing messages, and the caller's requested telephone number.

The voice server 120b, also called a voice response unit (VRU), is incorporated into the system to play the frequently repeated parts of an operator's speech, namely the various greetings and signoffs (or closings), and the caller's desired telephone number where requested. Not only does this system provide a voice-saving and monotony-relief function for the operators, it performs a "branding" function (i.e. the prerecorded messages incorporate the name of the telephone company through which the caller was routed to the directory assistance service), and it also reduces the amount of time an operator is actually connected to a caller. The voice server may also contain a voice recognition system for receiving verbal input from a party connected to the voice server.

The DL/C database server 136 and data server 120a provide operators with the means to search for a caller's desired party, and determine the appropriate telephone number. In the preferred embodiment, the databases provide the capability to search not just by name and address, but also by type of goods/services and/or geographical region, or by any other attribute in the caller record, including phone number. For example, the preferred database can answer queries soliciting the names/numbers of Chinese restaurants on a given street. Data indexed in this fashion is usually not commercially available, so the present assignee starts with a commercially available database file (e.g. the Directory Assistance Database Source available from U.S. West), and enriches it by adding further data manually. The databases may be SQL relational databases. SQL (Structured Query Language) is a standard interactive and programming language for getting information from and updating a database. Queries take the form of a command language that lets you select, insert, update, find out the location of data, and so forth. Database servers 134 and 136 may also be located at a centralized location. Each remote LAN thus accessing these databases via the LAN. Servers 120a and 136 are separated for ease of explanation, but may be incorporated into a single database.

Desirably, the results of the database search presented on the operator's terminal 118 or fulfillment agent's terminal 121 are not alphabetized prior to display, but rather are presented in the order located by the database search engine. (If desired, a deliberate randomization of order could be effected before display.) Businesses at the beginning of the alphabet are thereby not unduly favored by callers using the directory assistance service. In the alternative, businesses can bid to be listed at the beginning of the list.

The database software itself is conventional. The presently preferred best mode is to use a relational database, such as is available from Sybase. However, much simpler software can alternatively be used, such as DBase 4.

Directory listing information may be obtained from a number of commercially available services and/or may be manually entered into the DL/C database server 136.

Figure 3:
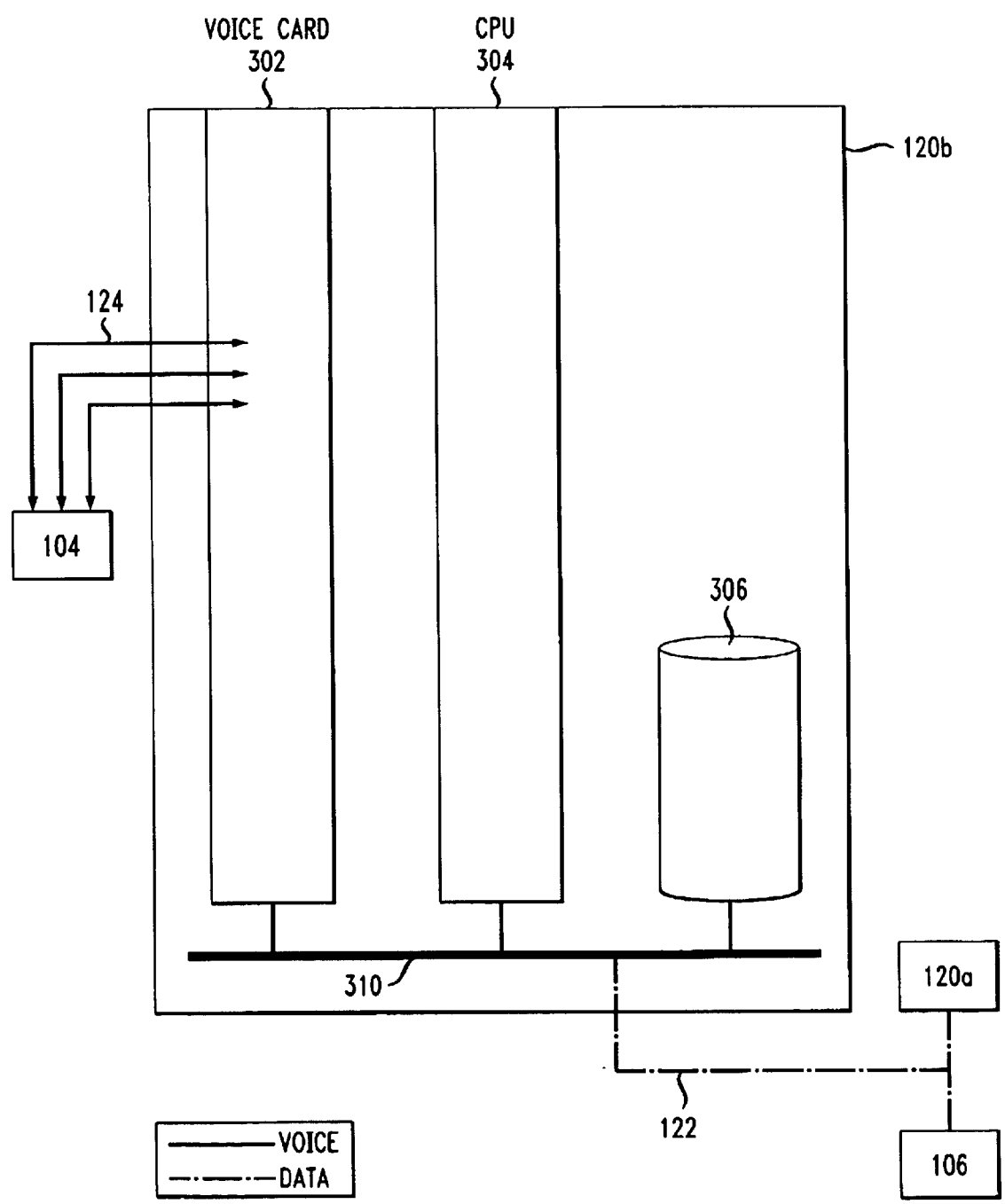
FIG. 3 provides a detailed view of a voice server used in an embodiment of the invention.
Figure 4A:
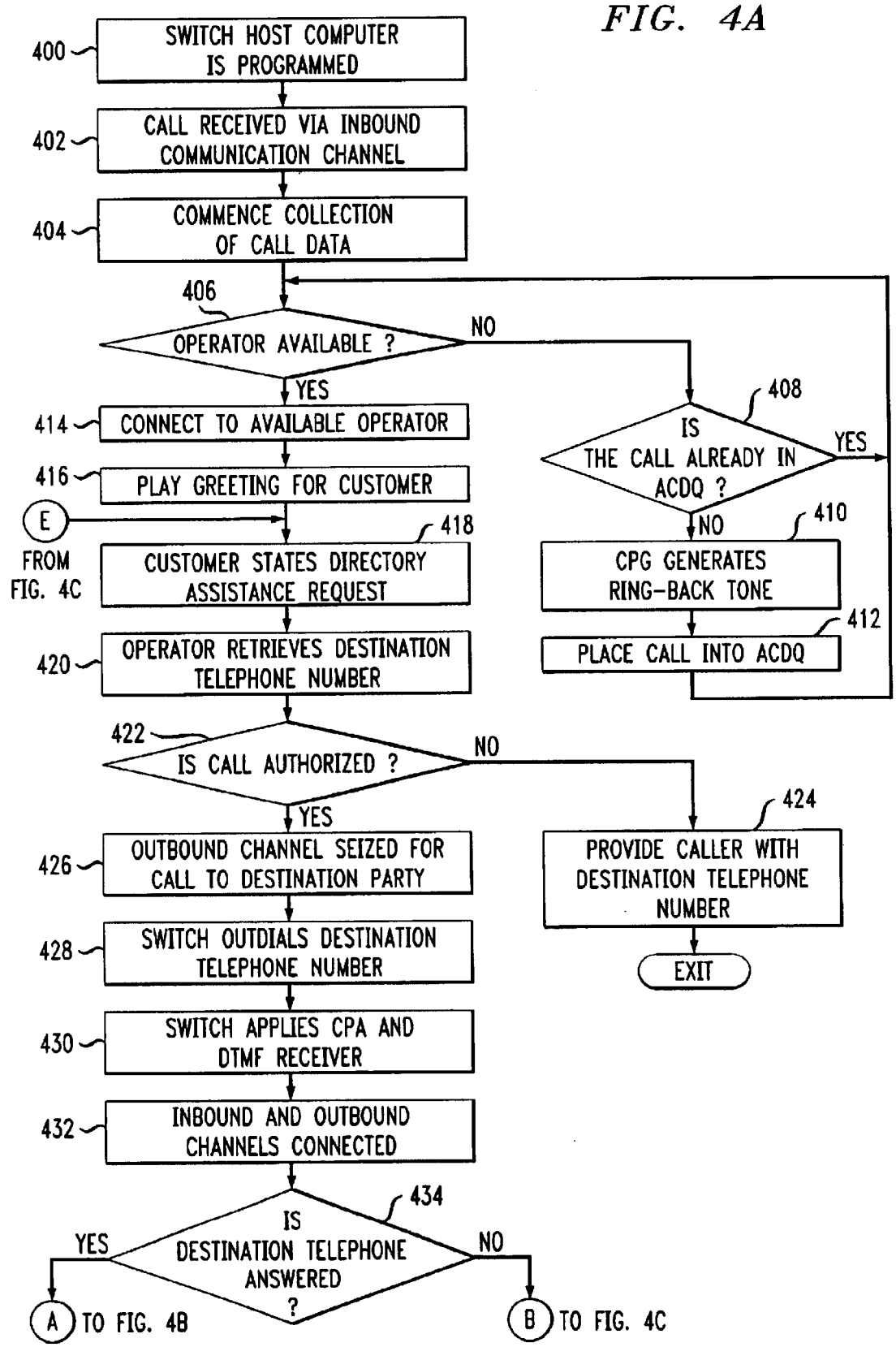
FIGS. 4A–E are flowcharts depicting a method of implementing the invention.
Figure 4B:
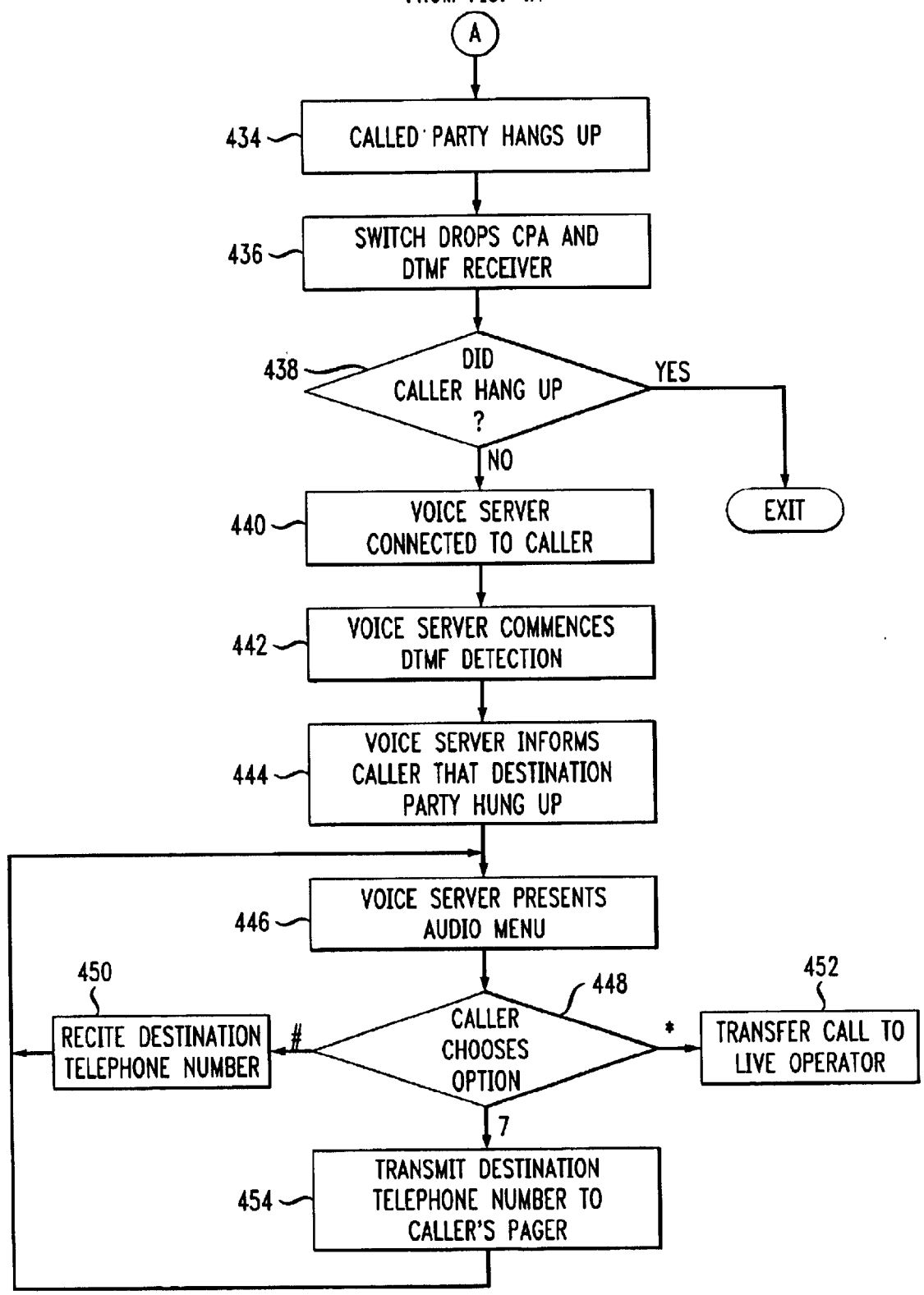
Figure 4C:
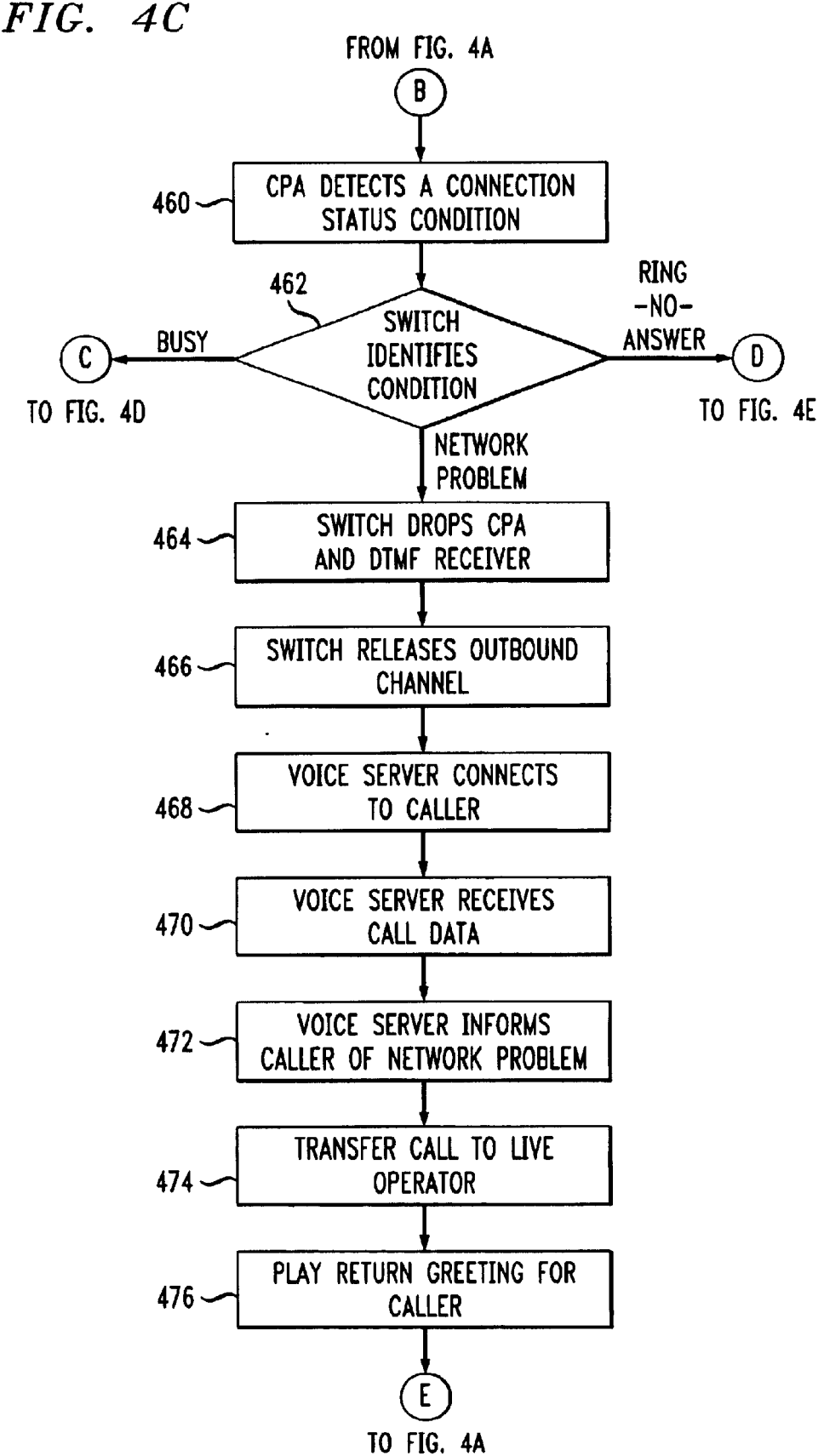
Figure 4D:
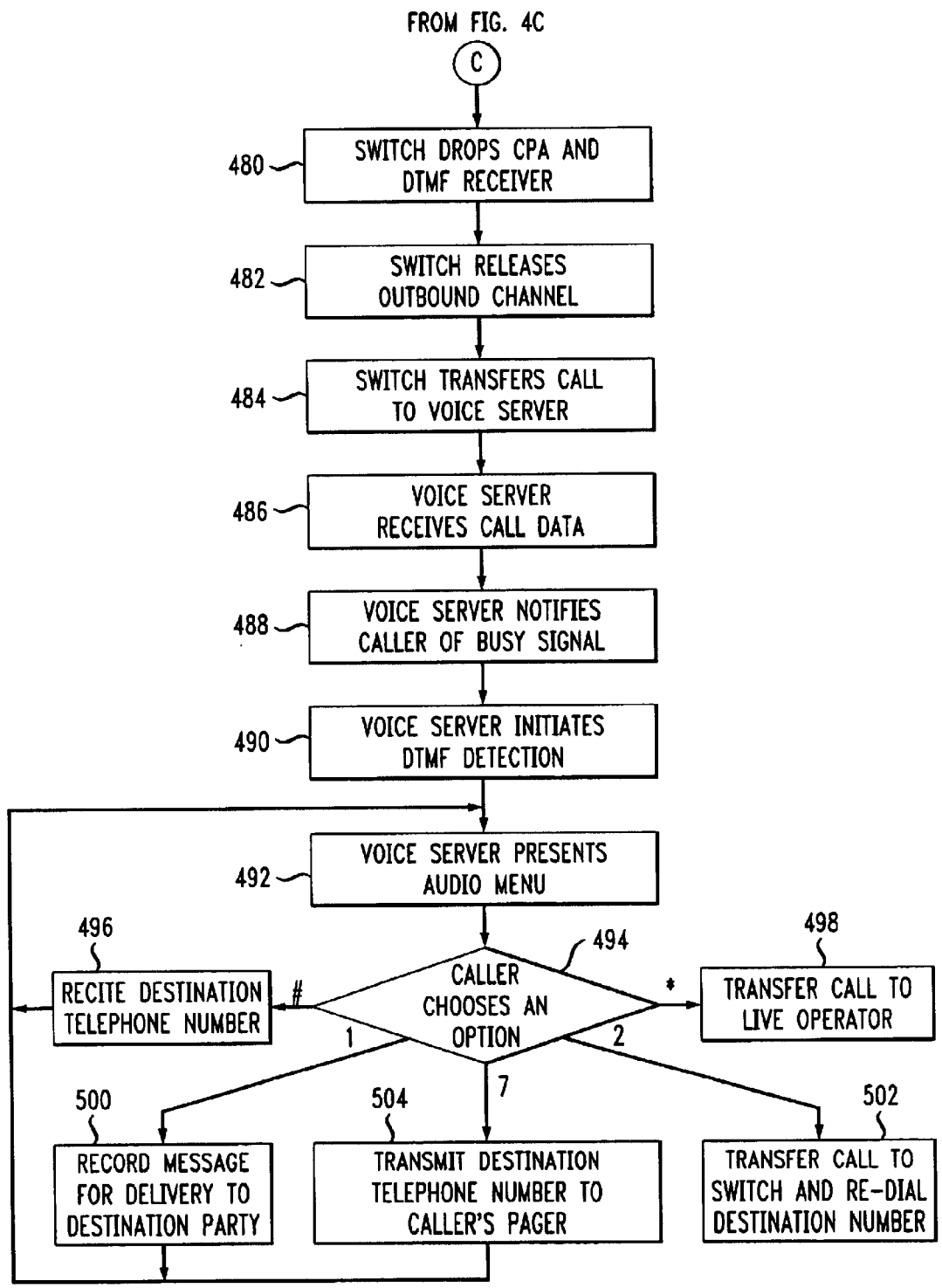
Figure 4E:
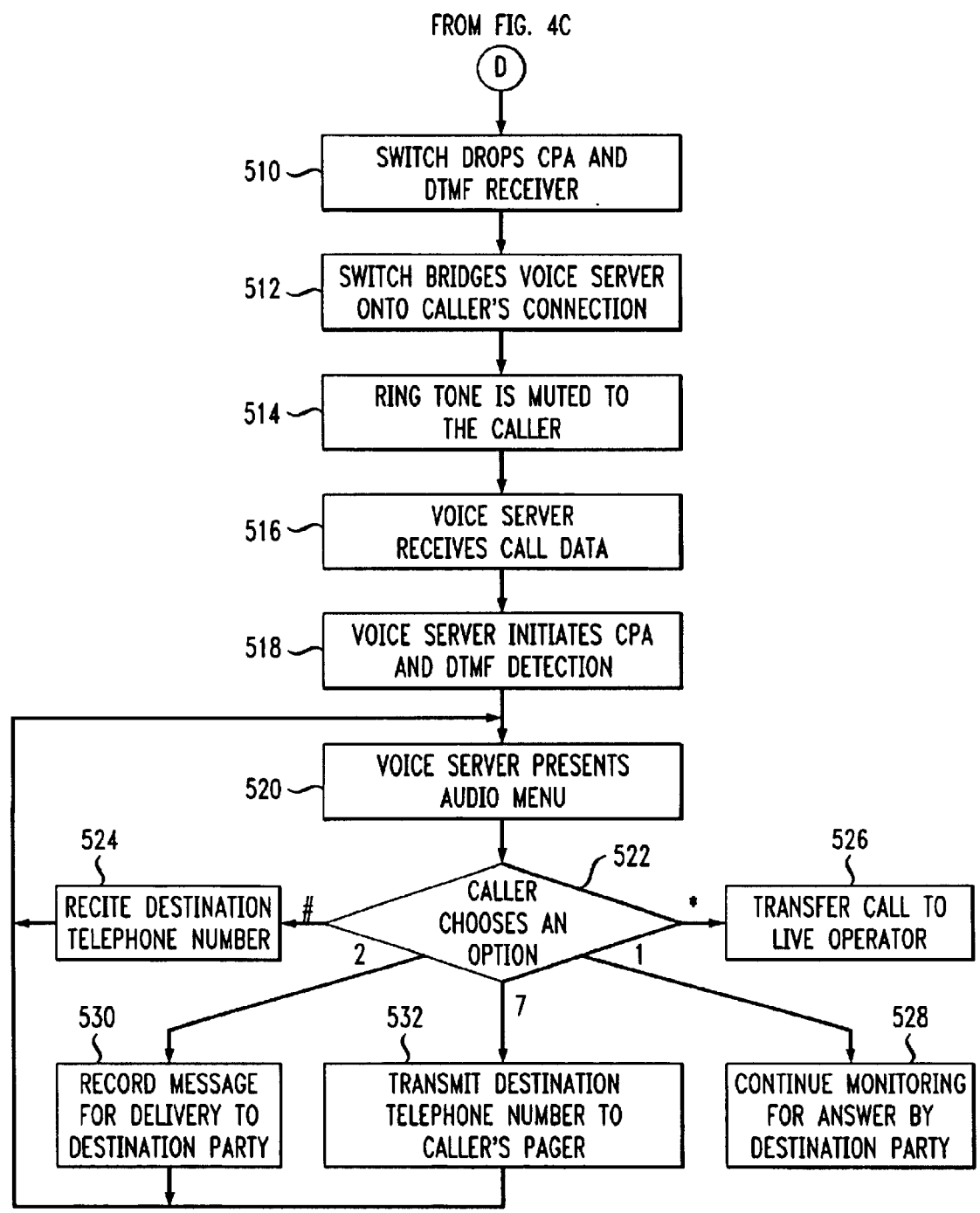

In an illustrative embodiment, depicted in FIG. 3, voice server 120b is connected to telephone switch 104 by voice server link 124 and to switch host computer 106 and data servers 120a via data network 122. Each voice server connects to telephone switch 104 via a separate voice server link. Voice server 120b consists of a general purpose computer plus one or more voice cards (a first voice card 302 is depicted in FIG. 3), which serve as the interface between voice server link 124 and voice server 120b. Voice card 302 monitors and controls communications over voice server link 124; its capabilities include telephone tone detection and generation, voice recording and playback, and call progress analysis. Therefore, very similar to telephone switch 104, voice server 120b is capable of detecting connection status conditions, detecting customer keypresses, and generating tones. Although FIG. 1 depicts voice server 120b distinct from data servers 120a, in alternative-embodiments they are coterminous.

Voice server 120b also includes typical computer components such as central processing unit 304, data storage unit 306, and bus 310 for transferring voice and data signals. Voice server 120b may also contain a voice recognition subsystem (not shown) for receiving verbal input from a party connected to the voice server.

Voice server link 124 provides voice connections between telephone switch 104 and voice server 120b, thus providing means by which callers may be connected to voice server 120b and receive automated operator assistance. Voice server link 124, in an illustrative embodiment of the invention, is comprised of one or more T1 spans, with each one of the 24 channels of each span providing two-way communication.

At appropriate stages in a call progression, the switch host computer 106 initiates a voice path between the voice server and the switch 104 such that the caller, or the caller and the operator, are able to hear whatever pre-recorded speech is played on that circuit by the voice server. Computer 106 then instructs the voice server, via the data network, what type of message to play, passing data parameters that enable the voice server to locate the message appropriate to the call state, the service-providing telephone company, and the operator. The recording density used is high enough to provide a good enough quality of message playback that most users of the system should be unaware they are listening to a recording.

Advanced Directory Assistance Services

When, as described below in connection with one method of implementing this invention, the caller is connected to voice server 120b after a busy signal or a ring-no-answer condition is detected, subsequent monitoring of inbound channel 102a and outbound channel 102b is performed by voice server 120b; switch 104 continues to monitor outbound channel 102b to detect, for example, when the destination telephone is answered or disconnected. As mentioned above, voice server 120b contains voice card 302 which provides telephone signal detection and generation capabilities comparable to those of telephone switch 104. By drawing upon these capabilities, directory assistance system 100 can offer advanced directory assistance services to callers. Three services are of particular value, and directory assistance system 100 can be configured to automatically offer all, or a subset, of the three services to callers who encounter a busy signal or a ring-no-answer condition after the directory assistance system attempts to connect them to their destination parties.

The first service of particular interest serves to inform the caller of the telephone number retrieved in response to the caller's directory assistance request. Illustratively, the caller will press the "#" key to invoke this service. In response, voice server 120b conveys a verbalization of each digit in the telephone number. Alternatively, the caller may press another key, such as the "7" key, to receive the destination telephone number via his or her alphanumeric pager. One method by which directory assistance system 100 may deliver the destination telephone number to the caller's pager is by formatting a message containing the information to be provided, sending the message to a paging server maintained by the customer's service carrier, from whence it is sent across the carrier's paging network to the customer. The message may, alternatively, be received on another alphanumeric communication device, such as the customer's wireless telephone. The message will typically be addressed to the customer's automatic numbering identification ("ANI") that was received with the customer's call. The message passed to the customer will include the destination telephone number and may include further identification data such as the name and/or address of the destination party.

The second service allows a caller to leave a message for a currently-unreachable destination party. Voice server 120b records the message provided by the caller and, at configurable time intervals in the future, attempts to connect to the destination telephone. When a successful connection is established, the message is delivered. In a present embodiment, if the successful connection is to a live person or an answering service, the answering person will be informed that a message exists for a specified destination party and will be requested to press a particular key to receive the message. After playing the message, it may be played again. In this embodiment, if the successful connection is to an answering machine, the message will be played for the machine to record, thus allowing the destination party to easily retrieve it.

In an alternative embodiment of this service, the destination party will be required to call directory assistance system 100 to retrieve the message left for that party by the original caller. The party must enter an access code to retrieve the message, thus ensuring that private messages are adequately protected. If delivery or notification of the stored message is attempted for a predetermined number of times without success, the message will be deleted and the failed delivery attempt will be noted.

The third service of particular interest enables a destination party to return a calling party's call via a single keypress, and has particular value when used in conjunction with the second service. In such a combination, after voice server 120b plays the message for the destination party, the destination party may press a specified key to initiate a call to the original caller. Voice server 120b will handle this as a normal outgoing call.

Concierge-Like Services

As illustrated in FIG. 5, the telephonic system according to a preferred embodiment of the present invention includes a wide area network (WAN) 30 covering a wide coverage area. The WAN 30 can be an Internet-based network such as the world wide web or can be a private intranet based network. According to a preferred embodiment, the WAN 30 covers an entire region (e.g., the entire eastern seaboard of the United States), an entire country (e.g., United States) or group of countries (e.g., all of Canada, Mexico and the United States). The WAN 30 connects a plurality of operators and fulfillment agents dispersed throughout the wide coverage area in a plurality of directory assistance centers 21, 22, 23, 24, 25, 26 and 27. Each of the directory assistance centers 21, 22, 23, 24, 25, 26 and 27, which in this instance comprises directory assistance system 100 described above, covers one or more regional coverage areas. One or more information hubs 10 are also included in the WAN 30. An information hub 10 contains one or more databases 20 and one or more servers 28 which are accessible by the operators, and fulfillment agents in system 100.

Operators are generally provided with web browser capabilities, telephone facilities as well as fully-featured operator user interface applications which facilitate the searching and retrieval of directory assistance information from database sources. It is well understood that directory assistance operators receive and respond to requests for directory assistance. According to the present invention, in addition to responding to requests for directory assistance, the operators are capable of receiving requests from calling customers throughout the system for requests for concierge-type services. When a request for concierge-type services is received by an operator, the operator completes a record of the request. This record is referred to as a "ticket."

A web-based form of ticket is accessible by each of the operators over the WAN. One such form is shown in FIG. 6. To complete the ticket, information regarding the concierge services request is gathered in a number of ways. The customer may, for example, specifically request a particular restaurant or a particular airplane flight or hotel reservation. Using a request for a restaurant reservation as an example, the operator may solicit from the calling customer their first choice for a restaurant, their second choice for a restaurant, preferred seating times, alternative seating times, etc. In this case, information may be directly entered into the form.

More typically, however, the customer will have certain desires—e.g., a vegetarian outdoor restaurant in 'Cardiff by the Sea' as per FIG. 6, or a midnight flight from New York's JFK Airport to San Diego International airport. In this case, the operator will search the various databases at his/her disposal to compile a specific request for the calling customer. (The term "operator" is meant to include both human operators as well as automated operators such as voice response and voice detection units.) The operator may then obtain directly from the calling customer information regarding preferred seating times, alternative seating times, etc.

Information, such as who the calling customer is and contact numbers so that the system can confirm with the calling customer when the request is fulfilled, are advantageously obtained from information regarding the calling customer residing on the system databases. The system automatically uses this database information to complete part of each ticket.

According to the present invention, the operator's web browser provides a direct connection to either a server in one of the information hubs, or to a central server, in the system. In essence, the operator interface and the server are in a client-server arrangement. Thus, in effect, when the ticket is filled-in, the operator sends the ticket over the WAN to the concierge database to be picked up for fulfillment.

Fulfillment agents fill the requests for concierge services received by the operators. Fulfillment agents are provided similar web browser and telephone facilities to those provided to the operators. By means of the web browser, the fulfillment agent has access to one or more web pages. These web pages provide the fulfillment agents with information regarding outstanding requests for concierge services. (The public's access to these web pages is restricted so the privacy of the calling customer is protected.) When a ticket created by an operator needs fulfillment in a particular regional coverage area, the web page for the fulfillment agent in that regional coverage area will change and indicate that a ticket needs to be processed. The system periodically refreshes the web pages to keep fulfillment tickets current. Advantageously, the fulfillment agents are located throughout the coverage area. A fulfillment agent preferably is an individual with specialized knowledge of the regional coverage area and the services provided therein so they can effectively fulfill the requests for local concierge services. The fulfillment agent may be a call center supervisor, an underutilized operator or a task specific employee in a particular directory assistance center.

According to the preferred embodiment, a centralized concierge relational database is maintained in a central information hub. The preferred database being a structured query language (SQL) relational database, although other relational and non-relational systems may be implemented without departing from the scope or intent of the present invention. A motivation behind maintaining the concierge database in a single information hub is that such centralization provides the capability of receiving a request for concierge services in a first regional coverage area where the requested services are in a second regional coverage area. For example, suppose a business traveler in New York intends to fly later that day to San Diego to have dinner that evening in "Cardiff by the Sea." The traveler dials the New York directory assistance center. The traveler informs the operator who receives the call in the New York center of his travel plans and his desire to eat at a "Cardiff by the Sea" restaurant. The operator in the New York center creates the ticket for the business traveler. That ticket is recorded in the centralized concierge database. The server will then automatically route the ticket to a fulfillment agent in the San Diego directory assistance center. As a result, the ticket appears on the screen of the San Diego fulfillment agent in the San Diego directory assistance center.

Each directory assistance center has an identification number and/or name. When an operator creates a ticket, the system by default assigns the ticket to the directory assistance center where it was created. This is accomplished by assigning the originating center's identification number/name to the ticket. However, the operators have the capability to change this assignment, by manually inputting the identification number/name of the center where the request for concierge services is to be directed. In the example above, the operator in the New York center would change the identification number/name of the fulfilling center from the default of the New York center to the San Diego center.

While implementation of full concierge databases/database server in each directory assistance center adds administrative overhead, the present invention encompasses embodiments where the concierge database/database server is not centralized in a single information hub but is instead distributed throughout the system. Similarly, in a further alternative embodiment in addition to the centralized database, one or more localized concierge databases may be maintained locally to keep, maintain and update travel and concierge-type information relevant to only that particular locale. Further, while the concierge database is described and depicted as a separate and independent database from the other maintained databases (e.g., directory assistance database or a customer information database), it is well understood by those skilled artisans that the concierge database may reside as part of one or more of the databases maintained by the organization.

Referring to FIG. 5, both the operators and fulfillment agents have access to these concierge databases. The WAN 30 connects the operators and fulfillment agents to the concierge databases 20. In general terms, the concierge database maintains information regarding concierge services. For example, the concierge database includes customer credit card information, and information regarding the status of the request for concierge service. Typically, restaurants and hotel listings are maintained on a directory assistance database separate from customer and ticket data. However, in an alternative embodiment, all concierge information is maintained on a separate concierge database.

A further network is provided to connect the fulfillment agents to providers of services, such as airlines, hotel chains, restaurants, travel agents (including web-based travel service providers such as Expedia, Priceline.com, Travelocity).

Such a network connection may be a public or private network (such as a VPN).

FIG. 6 illustrates a graphical interface used by an operator to generate a ticket. The interface is designed so that the operator asks appropriate questions to accumulate sufficient information to fill the customer's request. The intent of the interface is that the ticket can be filled by the fulfillment agent without further interaction between the system and the calling customer. However, should further interaction be required, the interface includes contact information so a follow-up phone call can be placed to the customer, either to advise the customer that the request has been filled or to obtain further information so the request may be filled. The interface shown in FIG. 6 is directed to a request for a restaurant reservation. It should be appreciated that different interfaces may be used for different types of requests. For example, an interface may be specifically designed for hotel reservations, airplane reservations or car reservations. The operators may select via menu the appropriate interface for the customer request. Alternatively, the appropriate menu may be selected automatically by the system based on skills-based routing or by dialed telephone number.

Referring now specifically to the interface shown in FIG. 6, the interface includes a plurality of sets of fields, each of the fields capable of capturing data input. The first set of fields relates to the identification of the calling customer. The first of the three fields in the first set is the "Name of Reservation" indicating the calling customer requesting the reservation. The second field is the "Caller MIN" indicating the calling customer's Mobile Identification Number (MIN). The third field is the "Carrier ID" indicating the carrier who provided the call to the calling center. The system may be designed to input the information into these fields automatically. The calling center's switching equipment described herein is capable of detecting the information associated with these fields directly from the incoming call. Thus, when an operator selects this interface in connection with a call, these fields may automatically be filled in. Additional fields relating to the identification of the calling customer may also be automatically filled in and displayed. The additional fields include the home address of the calling party and the present location of the calling party to the extent such information is available from the carrier, by GPS or other locating means.

The next two sets of fields relate to the particular restaurant desired by the calling customer. The first set of fields relate to the first choice for the restaurant, its phone number, and its address. Similarly, the second set of fields relate to the second choice for the restaurant, its phone number and its address. The fields titled "First Choice Restaurant" and "Second Choice Restaurant" are typically completed with information solicited by the operator from the calling customer. However, records kept in the databases may include a list of favorite restaurants for this particular customer. In addition, there may be more than one list of favorite restaurants maintained, one for each of the different cities frequented by the calling customer. In another embodiment of the present invention, the operator may offer the calling customer recommendations of restaurants from well-known lists of restaurants such as those generated by Zagats, Sidewalk.com or another director database maintained by the system. Advantageously, once the "restaurant names" fields are completed, the remaining fields relating to the phone number and address of the restaurants may automatically be filled in by information obtained from the directory assistance databases maintained in the system. Relevant database information can also be manually transferred by the operator into the ticket fields.

The next set of fields in the operator interface relate to the details needed for making the restaurant reservation. The first field is titled "Date of Reservation" which is the date the customer wants the reservation. This field is completed with information solicited by the operator from the calling customer. The date of the telephone call is used as the default and may be modified by operator input to a future date if requested by the caller. The next field is titled "Number in Party" and corresponds to the size of the party for which the reservation is sought. This field is completed with information solicited by the operator from the calling customer. This field advantageously may default to information contained in a record entry in a database corresponding to the calling customer's preferred size of dining party. The third field is titled "Preferred Time" which corresponds to the time the calling customer desires the reservation. This field is completed with information solicited by the operator from the calling customer. This field advantageously may default to information contained in a record entry in a database corresponding to the calling customer's preferred dining hour. The fourth field in this set is titled "If unavailable then from:" which corresponds to the calling customer's acceptable dining times. Again, this field is completed with information solicited by the operator from the calling customer and advantageously defaults to a record entry in a database corresponding to the calling customer's preferred dining hours.

The last set of fields in the operator interface corresponds to contact information. The contact information fields comprise two sets of fields corresponding to a contact name, contact method, and telephone number. Typically, this information advantageously defaults to information contained in a record entry in a database corresponding to the calling customer's preferred contact names, methods and phone numbers. The operator is expected to confirm with the calling customer the correctness of this information. Regarding the contact method, a pulldown menu is provided. Any number of contact methods are available including phone, wireless phone, pager, fax, and email. Whenever one particular method is chosen, the corresponding telephone number and/or email address appears. It is understood that the same name may be entered in both contact name fields but two different contact methods may be chosen, for example, phone and pager.

A notes field not illustrated in FIG. 6, is an additional field in which the operator may type in comments such as special dietary requirements, special seating requests, etc.

A further field not illustrated in FIG. 6 is the field associated with the center targeted to fill the request. As described previously, the system uses the center which generates the ticket as the default fulfillment center. However, in instances in which the caller seeks concierge services outside the generating center's regional area, the operator will modify the ticket to direct the ticket to the appropriate fulfillment center. In a preferred embodiment, the system, automatically recognizes when the request for concierge services are outside the generating center's regional area and will prompt the operator if he/she wants to direct the ticket to a more appropriate calling center.

Some forms of tickets according to the preferred embodiment are illustrated in FIGS. 7–10. Referring to the form of ticket illustrated in FIG. 7, this ticket is presented by the system to a fulfillment agent sitting in the directory assistance call center which will fulfill the ticket, in this example the San Diego call center. Via the WAN, the server in the information hub directs a ticket to the display of a San Diego fulfillment agent. The ticket provides the fulfillment agent with general information regarding a customer's request for concierge services. For example, with the ticket shown in FIG. 7, the fulfillment agent is provided with information regarding the identification of the ticket, the date and time of the next action to fill the request, the desired reservation date and time, the name of the requesting customer, the name of the target restaurant and the status of the request.

A first field is labeled "ID" and corresponds to the identification of the particular request for concierge services. The ticket is linked in the database to other records regarding the concierge services request such as all of the information taken down by the operator in generating the request. The fulfillment agent can access these additional records by selecting the ID field. (Because the ticket is presented to the fulfillment agent in the form of a web page, the fulfillment agent may select the ID field by means of a mouse click. The system server recognizes the mouse click and presents information to the operator.)

It is understood that a fulfillment agent will usually attempt to fill more than one ticket at a time. Thus, a fulfillment agent will necessarily have the capability to step through the various tickets currently at the fulfillment call center that require fulfillment. This advantageously allows the fulfillment agent to prioritize which of the then-pending tickets he/she will attempt to fulfill. Server software may also automatically prioritize tickets, allowing the fulfillment agent to override such prioritization if necessary. The concierge database may be searchable by any and all of the fields in the request, but preferably by the restaurant or customer name. In FIG. 7 it is shown that the agent is provided on his/her screen, facilities to search requests by restaurant name or by reservation name. In addition, the fulfillment agent may step through the tickets pending at that call center, one by one, by page-up and page-down keys, or by back and forward keys on the web browser interface.

The system creates an environment to ensure that tickets are responded to by fulfillment agents in such a way so as to maximize the probability that customers' requests are filled. One of the methods that the system implements towards this end is to prioritize, schedule and record all of the actions taken by the fulfillment agents on each request. Thus, the system advantageously minimizes the amount of guess work associated with the request. Instead, it provides each fulfillment agent with clear instructions when attempts to fill a request should be made. The field labeled "Next Action Date/Time" is integral in this process. It informs the fulfillment agent of the time and date that the agent should attempt to fill the customer's request. The system advantageously includes an alarm subsystem which automatically signals the fulfillment agent that an action should be taken toward the fulfillment of the request.

In terms of prioritization, the system employs one or more queues which allow the system to process tickets based on next action time. Depending upon the availability of system resources, the system may assign a plurality of fulfillment agents to each of the queues to maximize the probability of request fulfillment. Each ticket's next action time is preferably based on when an action last took place. A ticket's next action time may be set as follows:

1. No further action required as of midnight of the reservation date.
2. Currently needs further processing.
3. Needs more processing as target telephone was busy.
4. Needs more processing as targeted telephone had no answer.
5. Fulfillment agent may override the next action time.

More urgent tickets may be processed before less urgent ones. The system weighs a number of factors in determining which of the tickets are most urgent. These factors include the proximity between the current time and the reservation date and time and the duration of time that the request has been under the status "Requires Fulfillment." In addition, particular customers may warrant higher or different priority treatment. With these requests, the systems may place these tickets ahead of other tickets in the queue. Alternatively, the system may employ two queues, one for priority customers and one for non-priority customers. Special fulfillment agents, such as those having special language skills or those having more years of experience on the job, may be assigned to the priority queues.

Figure 8:
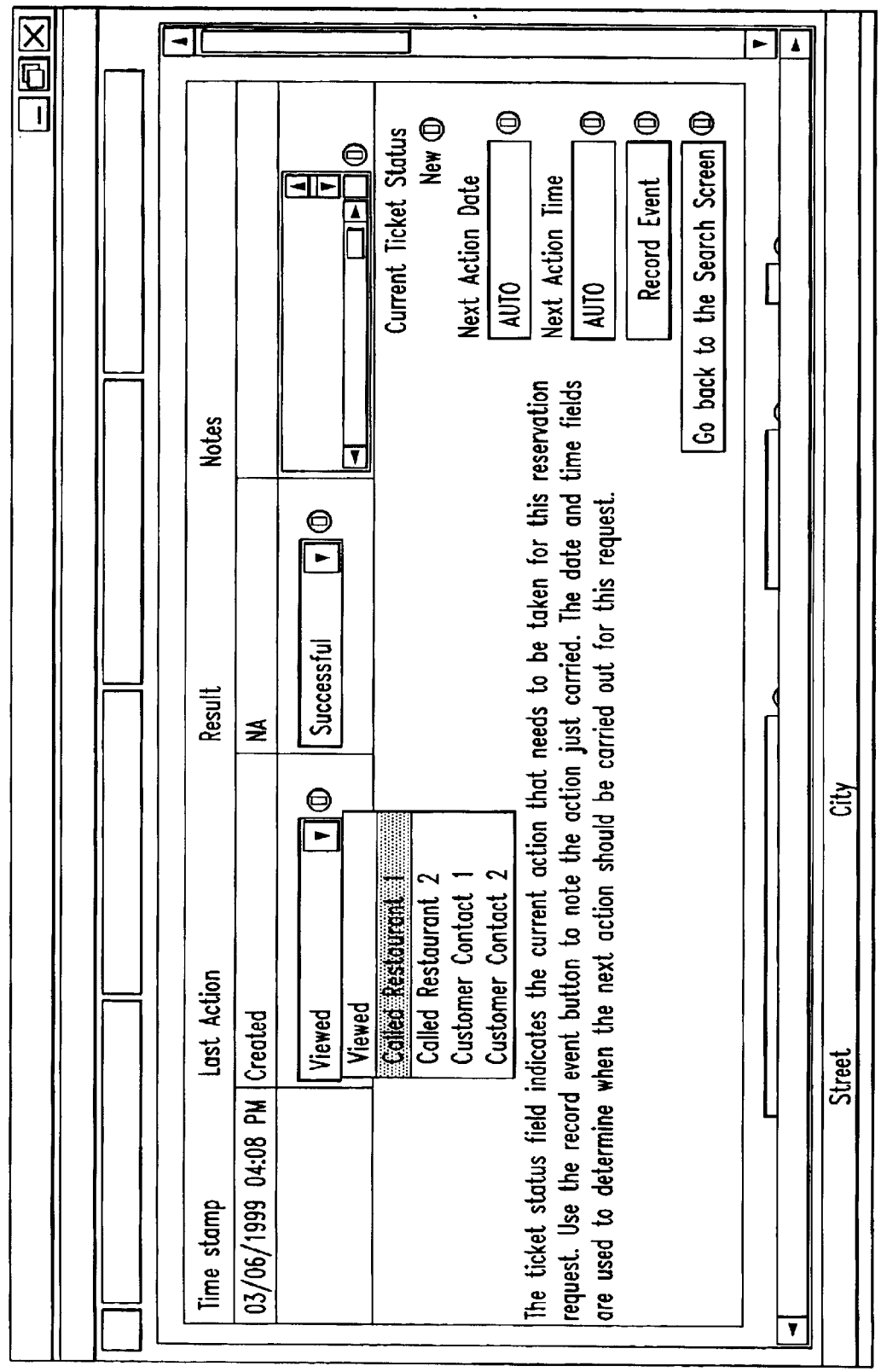
FIG. 8 illustrates a third graphical user interface of the present invention.

Scheduling and recording of the processing of tickets is now described in connection with FIGS. 8–10. FIG. 8 illustrates a ticket after its creation. The ticket comprises a request section and an event section. The request section appears just below the event section and is simply the request as taken down by the operator as described above in connection with FIG. 6. The fulfillment agent may scroll up and down the page to view the different portions of the ticket.

The event section is illustrated in FIGS. 8–10. The event sections are essentially a menu-driven table. The event table facilitates the scheduling and recordation of all of the actions taken upon a particular request. A time and date stamp identifies when the last action was taken upon the request. Next, a menu driven list sets forth all of the permissible actions that may be taken with respect to the request. The list of permissible actions include calling the first restaurant, calling the second restaurant, contacting the first customer contact, contacting the second customer contact, or simply viewing the request. Additional action types may be added, as needed. One of the major advantages of the present invention is the ease by which these actions are taken by the fulfillment agent. Upon selection of a particular action, the directory assistance center automatically retrieves the number or routing information of the appropriate party (e.g., the telephone number of the first or second restaurants or the pager or email address of the first or second customer contact) from the ticket record and may thereafter attempt to establish a connection with the appropriate party. The directory assistance center of the present invention includes one or more voice and/or data connections which provide connection to a public network over which outgoing calls or messages may be placed. Because of this environment, when the fulfillment agent selects a particular action in the menu, a connection to the appropriate party may be established without further action on the part of the fulfillment agent. This eliminates the requirement that the fulfillment agent look up the telephone number in some database (whether it be a phone book or computer database), manually dial the telephone number, redial if a misdial occurs, look up a second number for the second restaurant, and so on. Thus, the present invention significantly reduces the time and effort associated with providing concierge services. The fulfillment agent may also, if desired, manually dial the desired telephone number.

The next column in the event table is a menu driven list of the results of the last action. The list of permissible results of the last action include both the successful completion of an action (e.g., reservation made at desired time, customer contact notified and reservation confirmed, etc.), incomplete attempt to complete action (leaving message on answering machine of restaurant, being placed on waiting list of restaurant, reservation available but outside range of time, unable to contact person, etc.) as well as the failure to complete a request because of the inability of the restaurant to meet the customer request (no reservation within range requested, no tables available, etc.). In addition, any of the possible network communication events such as ring-no-answer, busy, or network problem may be result of last action. These network communication events may advantageously be detected by the directory assistance center and automatically entered into the list.

The next column in the events table is a place for the fulfillment agent, if applicable, to write any notes. These notes, along with the remainder of the ticket, allow a second fulfillment agent to pickup where a first fulfilment agent left off and continue processing the first fulfillment agent's ticket.

A ticket has a current status. The ticket may be "new." A "new" ticket indicates there is a first action to be taken for the reservation request. The ticket may "require fulfillment." A ticket "requiring fulfillment" indicates a first action has been taken but further actions are required. The ticket may "require customer notification." A ticket requiring customer notification indicates that the customer must be notified because either the reservation has been successfully completed or there was a failure to complete the reservation and no other actions are possible. The ticket may also be "canceled" or "closed" indicating that the customer has canceled the request or that the request has been completed and the ticket has been closed. A "notified" ticket indicates that the customer has been informed of the status of the request.

The event section of the ticket further includes a next action time/date. Whenever further actions are required on the ticket, the system automatically establishes a time and date for the next further action to be taken. The system uses a simple algorithm to establish the time and date for the next action. So long as there is sufficient time between the current time and the time by which the reservation must be made, the next action time/date will be set at regular intervals (for example, every 15 or 30 minutes). However, when the time between the current time and the time by which the reservations must be made draws near, the next action time/date will accelerate to ensure the customer is notified. This auto next action time may be manually overridden.

Method of Operation

One method of implementing the present invention is depicted in FIGS. 4A–4E. As an initial process, switch host computer 106 is programmed at step 400 with instructions for configuring and operating telephone switch 104 in accordance with the present invention. The instructions are loaded in computer-readable form, as is known in the art.

A directory assistance call is received (step 402) by directory assistance system 100 at T1 interface 230 of telephone switch 104 via inbound communication channel 102a. A directory assistance call may originate at virtually any telephone, whether wireless, portable, or stationary. Callers of a particular telephone company simply dial the access digits established for directory assistance by that company. Examples of typical access digits are "#555" and "555-1212."The participating telephone company's own switching system will then reroute the call to the directory assistance service center 100 (via a T1 channel), where it appears as an incoming call.

In receiving the call, directory assistance system 100 also receives data concerning the caller's identity, such as the caller's ANI, and the area of the call's origination, such as the originating cell site. This information is used, as described below, to verify that the customer is authorized to connect to the desired destination party via directory assistance system 100.

Switch host computer 106 and data server 120a commence (step 404) the collection of call data, starting with the information listed immediately above. The call data is updated as directory assistance system 100 takes action on behalf of the caller. Therefore, when a caller makes successive assistance requests, the directory assistance provider (i.e., a live operator or voice server 120b) called upon to satisfy each subsequent request can refer to information concerning the caller's connection to directory assistance system 100 and the information provided in response to the caller's previous requests.

Switch host computer 106 determines (step 406) whether any directory assistance operators are available. If no operators are immediately available, and the caller has not already been waiting (step 408) for an operator, CPG 212 generates (step 410) a ringback tone across T1 interface 230 to inform the calling customer that his or her call is being queued to await an available operator. Waiting calls are then placed (step 412) into an automatic call distribution queue ("ACDQ") which is maintained by switch host computer 106 and constructed such that queued calls are routed to available operators in the order in which they were received. When one or more operators are available (step 406), a queued call, or if no calls are queued then a new call, is connected (step 414) to an available operator by switch 104 through EXCPU/MXCPU 204 and operator channel 112. In one embodiment of the invention, calls that are returned to an ACDQ due to an unsuccessful attempt to complete an outgoing call are placed into a separate ACDQ that has a higher priority than the ACDQ that holds new calls.

Once connected to an operator, a greeting message is played (step 416) for the caller. In illustrative embodiments, the message may be live from an operator or recorded (in the voice of the operator to whom the call is connected) and played back by voice server 120b. Switch host computer 106 directs the playback of recorded messages from voice server 120b by identifying the inbound channel 102a and the operator with which the caller is connected and specifying the message that voice server 120b is to play.

The caller typically then states (step 418) his or her directory assistance request by identifying, as far as he or she is able, the destination party he or she wishes to contact. The operator searches databases of information (e.g., listings of private individuals and businesses), stored on data servers 120a, for the appropriate destination telephone number. Database records matching the caller's query may be displayed on the inquiring operator's data terminal 118 in a variety of formats, such as alphabetical, random, etc. The operator retrieves (step 420) the information most closely matching the caller's request.

Based on the destination telephone number retrieved by the operator, the caller identification information received with the call by directory assistance system 100, and call authorization data stored on data servers 120a, the operating software on the data servers attempts to verify (step 422) the caller's authorization to connect to the destination telephone number through directory assistance system 100. For example, a caller may not be authorized to make long-distance telephone calls on his or her account. When such a caller connects to directory assistance system 100 from his or her home local calling area, the software simply determines whether the caller is trying to call a destination telephone number outside of the caller's local calling area. If, however, the caller is connected to directory assistance system 100 from a calling area outside of his or her home local calling area, the software uses the ANI received with the call, as well as the destination telephone number, to determine whether the caller is attempting to place a long-distance call.

If the caller is not authorized (step 422) to make the requested call through directory assistance system 100, the caller will merely be provided with the destination telephone number (step 424). Additionally, the caller may only be authorized to receive information from directory assistance system 100 (i.e., he or she may not place any calls through the system). In this situation, the caller could never advance further than step 424.

If, however, authorization is verified (step 422), the operator initiates an outgoing call for the caller by seizing (step 426) outgoing communication channel 102b from T1 interface 230 and outdialing (step 428) the destination telephone number. Outdialing is a function of telephone switch 104, whereby switch 104 transmits the destination telephone number after it is entered. Entry of the destination telephone number may be done manually by an operator (i.e., the operator keys the number in via operator telephone 116) or automatically by data server 120a (i.e., data server 120a delivers the destination telephone number to switch 104 after the number is identified by the operator).

Switch host computer 106 is notified of the outgoing call and automatically instructs telephone switch 104 to apply (step 430) CPA 218 to outbound channel 102b and DTMF receiver 214 to inbound channel 102a after outdialing. Although a plurality of the programmable DSPs on MFDSP unit 210 are allocated and configured as CPAs and DTMF receivers, they remain in a quiescent state until assigned to an outbound channel. Telephone switch 104 then connects (step 432) the calling customer on inbound channel 102a to the outgoing call on outbound channel 102b.

CPA 218 monitors the outgoing call on outbound channel 102b for a predetermined number of rings, a predetermined amount of time, or until a specified connection status is detected. A successful call, in which the destination telephone is answered, is recognized by T1 interface 230 of switch 104. Illustratively, T1 interface 230 identifies a successful call by detecting, on outbound channel 102b, the bit transition that occurs when the destination telephone converts from an on-hook status to an off-hook status. The detection of a successful call is relayed to switch host computer 106 by switch 104. In one telephone switch according to the invention, T1 interface 230 first notifies EXCPU/MXCPU 204 of the successful call via TDM midplane 202. EXCPU/MXCPU 204 in turn notifies switch host computer 106 via switch data link 108.

When an outgoing call is successfully completed (step 433), directory assistance system 100 remains passively connected to the call. When the destination telephone is disconnected (step 434), T1 interface 230 detects another bit transition indicating that the destination telephone changed from off-hook to on-hook, and switch 104 drops (step 436) CPA 218 and DTMF receiver 214.

If and when the customer disconnects (step 438), whether before or after the called party disconnects, the customer's call is broken down and the connection between the customer and directory assistance system 100 is terminated. If the caller does not disconnect from directory assistance system 100 within a configurable period of time after the called party disconnects, voice server 120b is connected (step 440) to the caller via voice server link 124. Voice server 120b, utilizing the capabilities of voice card 302, then commences (step 442) its own DTMF detection and, substantially simultaneously, presents (step 446) the caller with an audio menu of selected directory assistance options. The caller selects (step 448) an option by pressing the specified key, illustratively, the "#" key to hear (step 450) a recitation of the destination telephone number, the "*" key to be connected (step 452) to a live operator at operator position 114, or the "7" key to have directory assistance system 100 convey the destination telephone number to the caller by transmitting (step 454) it to the caller's alphanumeric pager or telephone. The customer's input is detected and identified by voice card 302. Voice server 120b performs the corresponding function, after which the caller may disconnect or return to step 446.

If, however, the call is unsuccessful (step 433), CPA 218 will detect (step 460) a telephone connection status condition such as a ring tone, busy, reorder, PBX intercept, SIT intercept, vacant code, reorder-SIT, no circuit LEC, reorder-carrier, no circuit-carrier, dial tone, continuous on tone, or silence. Telephone switch 104 identifies (step 462) the condition and notifies switch host computer 106. Subsequent action depends upon which connection status condition was detected.

Busy Signal

If the detected condition is identified as a busy signal (step 462), telephone switch 104 drops (step 480) CPA 218 and DTMF receiver 214 from outbound channel 102b and inbound channel 102a, respectively, then terminates (step 482) the outgoing call by releasing outbound channel 102b. Switch 104 then transfers (step 484) the caller to voice server 120b so that the caller can receive automated directory assistance. In order to transfer control of a call to voice server 120b, telephone switch 104 connects inbound channel 102a to voice server link 124. As opposed to directory assistance systems in which a voice server, operating under the control of a switch host computer, is merely conferenced or bridged onto a caller's connection with a switch or called parties, in the present embodiment of the invention not only does the voice server connect to the customer's call into directory assistance system 100, it also takes control over the customer's call. In order to route a call back to switch 104, either for transfer to a live operator or to re-dial a destination telephone number, voice server 120b simply sends a specified message to switch host computer 106 via data network 122 identifying which inbound channel the caller is on. Switch host computer 106 then instructs switch 104 to direct the new call attempt.

Along with the caller's connection, voice server 120b receives (step 486) the associated call data, described above, from switch host computer 106 and data servers 120a over data network 122. Voice server 120b then plays (step 488) a message to the caller, explaining that the destination telephone is busy, and initiates (step 490) DTMF detection on inbound channel 102a, using voice card 302, in order to detect keys pressed by the caller.

Voice server 120b presents (step 492) the caller with an audio menu offering several directory assistance options. The caller chooses (step 494) one by pressing the specified key, illustratively, the "#" key to have voice server 120b recite (step 496) the dialed telephone number, the "*" key to transfer (step 498) the caller to a live operator, the "1" key to record (step 500) a message for later delivery to the destination party, the "2" key to transfer (step 502) the call back to switch 104 and attempt the same destination telephone number again (by resuming operation at step 426), or the "7" key to receive (step 504) the destination telephone number via the caller's alphanumeric pager or telephone.

The caller's selection may, alternatively, be spoken into the caller's telephone and received by a voice recognition subsystem associated with, or contained within, voice server 120b. Unless the caller disconnected from directory assistance system 100, transferred, or recorded a message for later delivery, voice server 120b will automatically return to step 492 after performing the requested function. For the times when a caller records a message for delivery to the destination party, voice server 120b can be configured to either return the caller to step 492 or terminate the caller's connection. If the caller chooses to transfer to a live operator, telephone switch 104 takes control of the call from voice server 120b. If no operators are currently available, the caller hears a ringback tone generated by CPG 212 and is placed into a queue, as explained above.

When a directory assistance-connected caller is rerouted to a live operator after an unsuccessful call attempt, regardless of what connection status condition was encountered, the live operator receives substantially the same call data as voice server 120b did in step 486.

Ring-No-Answer Condition

When a ring-no-answer condition is detected (step 462), it is desirable to allow sufficient time for the called party to answer the call, but yet also provide the caller with options other than simply waiting continuously for an answer. After telephone switch 104 drops (step 510) CPA 218 and DTMF receiver 214, it bridges (or conferences) voice server 120b (step 512) onto the caller's connection. The ring tone received over outbound channel 102b is muted (step 514), and voice server 120b receives (step 516) the associated call data from switch host 106 and data servers 120a. Voice server 120b then initiates (step 518) its own DTMF detection, via voice card 302, in place of the counterparts dropped by switch 104 and presents (step 520) the caller with an audio menu.

The audio menu presented in response to a ring-no-answer condition is similar to that offered after a busy signal. The caller selects (step 522) an option by pressing the specified key, illustratively, the "#" key to have voice server 120b recite (step 524) the dialed telephone number, the "*" key to transfer (step 526) the caller to a live operator, the "1" key to continue monitoring (step 528) the outbound connection for an answer by the destination party, the "2" key to record (step 530) a message for later delivery to the destination party, or the "7" key to receive (step 532) the destination telephone number via the caller's alphanumeric pager or telephone. The caller's selection may, alternatively, be spoken into the caller's telephone and received by a voice recognition subsystem associated with, or contained within, voice server 120b. Unless the caller disconnected from directory assistance system 100, transferred, chose to continue monitoring outbound channel 102b, or recorded a message for later delivery, voice server 120b will automatically return to step 520 after performing the requested function. When a caller records a message for delivery to the destination party, voice server 120b can be configured to either return the caller to step 520 or terminate the caller's connection. If the caller chooses to transfer to a live operator, telephone switch 104 takes control of the call from voice server 120b. If no operators are currently available, the caller hears a ringback tone generated by CPG 212 and is placed into an ACDQ, as explained above.

If the caller chooses the option of returning to the ring tone, voice server 120b is dropped out of the conference, and switch 104 is responsible for detecting DTMF signals in order to allow the caller to connect to a live operator by pressing the "*" key. Unless the destination telephone is answered or the "*" key is pressed, directory assistance system 100 simply maintains the ringing outbound connection until the caller disconnects.

If the called party answers the telephone after the call is transferred (step 512) to voice server 120b, T1 interface 230 in switch 104 detects a bit transition on outbound channel 102b, as described above. Switch 104 then takes control of the call, terminates the connection to voice server 120b over voice server link 124, and the caller and the called party are connected.

Network Communication Failure

Connection status conditions such as reorder, PBX intercept, SIT intercept, vacant code, reorder-SIT, no circuit LEC, reorder-carrier, no circuit-carrier, dial tone, continuous on tone, and silence indicate a communication problem in the telephone network. In the event that one of these conditions is identified (step 462), subsequent action is quite different from when a busy signal or ring-no-answer condition is detected. Specifically, telephone switch 104 drops (step 464) CPA 218 and DTMF receiver 214 and releases (step 466) outbound channel 102b. Voice server 120b is connected (step 468) to the caller, receives (step 470) the associated call data, and informs (step 472) the caller that a network problem was encountered. The caller is then transferred (step 474) to a live operator at operator position 114 and hears (step 476) a return greeting message played by voice server 120b. Note that the caller was not required to take any action to be reconnected to a live operator; directory assistance system 100 automatically took the necessary action. Subsequent activity resumes at step 418.

SS7 Connection Procedure

In a SS7 system, the telephone company or wireless carrier transmits call set-up information associated with the call to the directory assistance center from the telephone company' signaling network node (via a T1 channel) to the directory assistance center. For purposes of illustration, a SS7 call initiation procedure will be described, which is utilized not only in routing a caller's call to the directory assistance center, but also by the directory assistance center in connecting the calling caller to the desired number.

The phone company (as the originating SSM) first transmits an Initial Address Message (TAM) to reserve an idle trunk circuit from the originating switch to the destination switch (in this case, switching matrix platform 104). The destination switch examines the dialed number, determines that it serves the called party and that the line is available for ringing. The destination switch then transmits an Address Complete Message (ACM) to the originating switch to indicate that the remote end of the trunk has been reserved. The destination switch rings the called party line and sends a ringing tone over the trunk to the originating switch. When the originating switch receives the ACM, it connects the calling party's line to the trunk to complete the voice circuit from the calling party to the called party. The calling party hears the ringing tone on the voice trunk. When the called party picks up the phone, the destination switch terminates the ringing tone and transmits an Answer Message (ANM) to the originating switch. The originating switch then verifies that the calling party's line is connected to the reserved trunk and, if so, initiates billing.

During the course of the call, if the calling party hangs up first, the originating switch sends a Release Message (REL)

to release the trunk circuit between the switches. Upon receiving the REL, the destination switch disconnects the trunk from the called party's line, sets the trunk state to idle, and transmits a Release Complete Message (RLC) to the originating switch to acknowledge the remote end of the trunk circuit. When the originating switch receives the RLC, it terminates the billing cycle and sets the trunk state to idle in preparation for the next call. On the other hand, if the called party hangs up first, or if the line is busy, the destination switch sends an REL to the originating switch indicating the release cause, such as a normal release or busy condition. When the originating switch generates the RLC, it terminates the billing cycle and sets the trunk to idle.

Automatic Call Distribution (ACD) logic is used to queue (if necessary) and distribute calls to operators in the order in which they are received, and such that the call traffic is distributed evenly among the operators. In other embodiments, other distribution logic schemes are utilized, such as Skills-Based Routing or a priority scheme for preferred callers. The queue is maintained by switching matrix host 106.

When a call is connected to an operator, switching matrix host 106 directs voice server 120*b* (also conferenced into the call) to play a greeting message, using a message prerecorded by the connected operator. Both the operator and the calling caller hear the message, which incorporates the name of the service or company to which the caller is a subscriber (in other words, the call is "branded"). The message ends with a prompt, thus cueing the caller to volunteer what information they are seeking.

When the automated greeting is complete, the voice server is disconnected, and the operator and the caller are left connected by a 2-way speech path. From this point, the caller is interacting with a live operator. In the event that the voice server is non-functional (for whatever reason), the incoming call is connected to the operator and a short "trill," or "zip" tone is played to indicate that a caller is on the line. (Note that once operators are logged in to the system, they wear headsets, and have their telephones 116 permanently off-hook. Their telephones do not ring when a call is presented.) The operator then speaks a greeting and prompt in real time, instead of the voice server playing a message.

Concierge-Like Service

Figure 11:
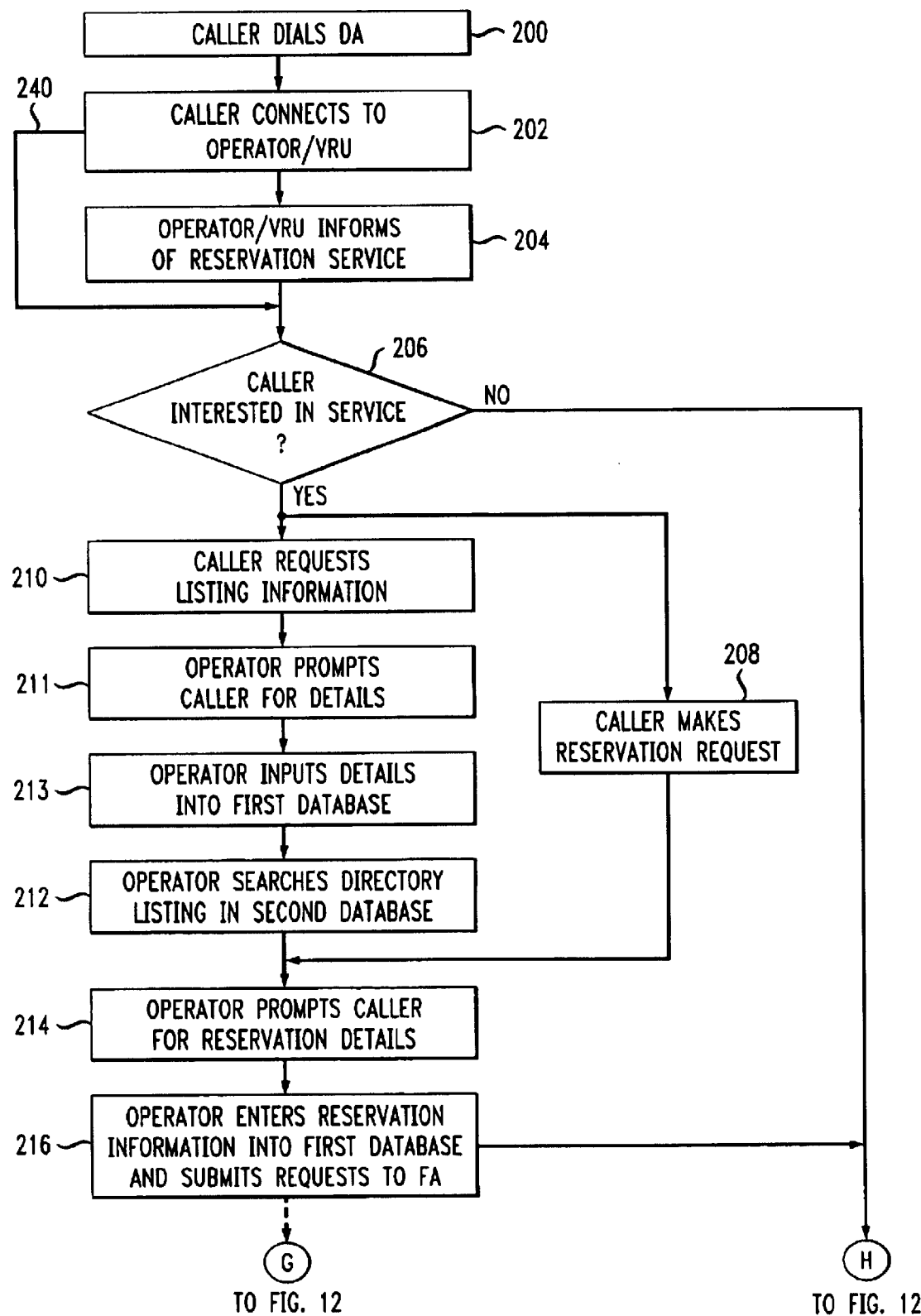
FIG. 11 is a flow chart depicting an embodiment of the method by which telephonic concierge assistance is provided to a caller.
Figure 12:
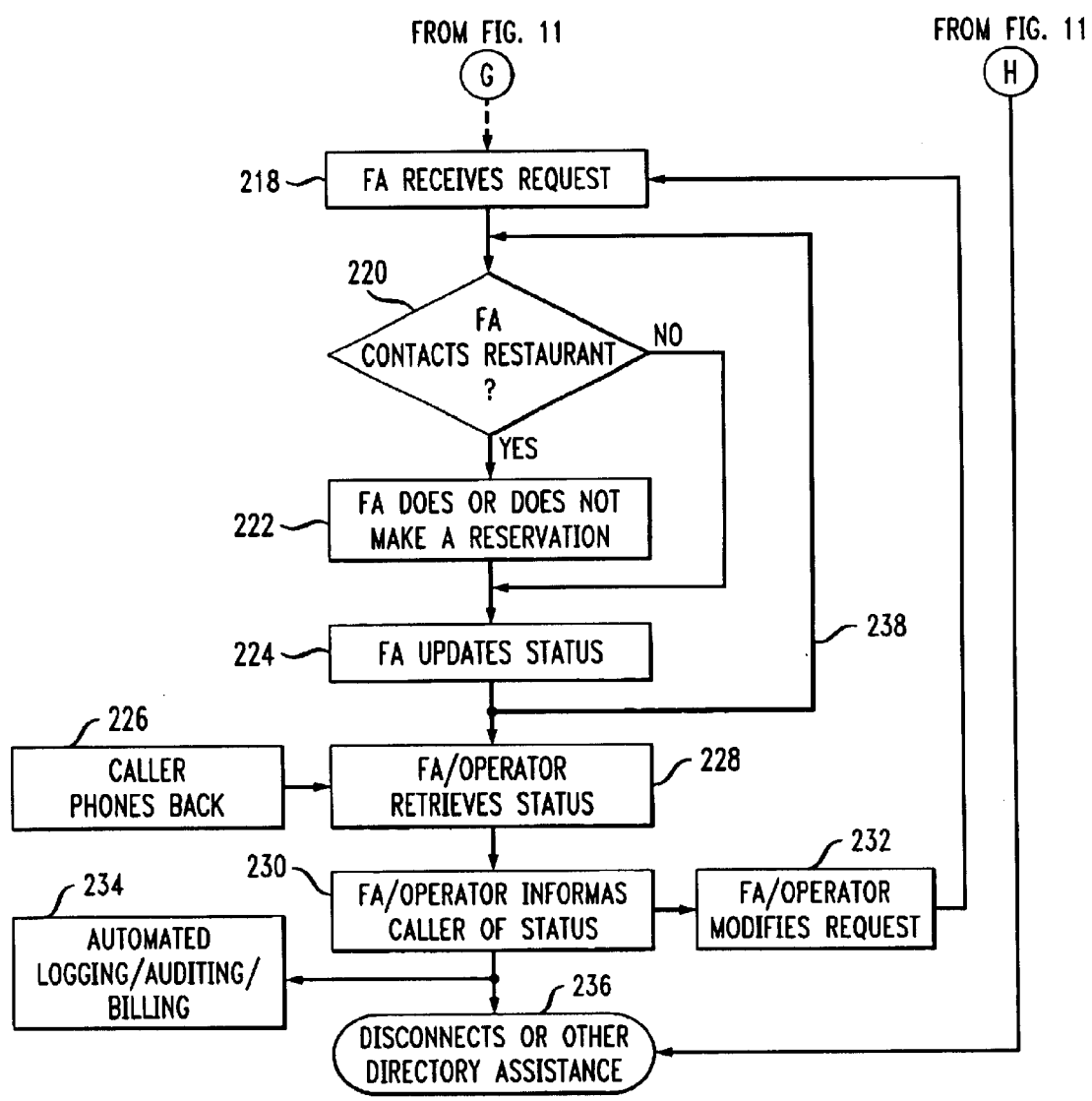
FIG. 12 is a flow chart further depicting an embodiment of the method by which telephonic concierge assistance is provided to a caller.

The concierge-like service will now be illustrated by an example, as per an embodiment of a method illustrated in FIGS. 11 and 12. The scenario depicted in the illustrative example is where a caller using his wireless telephone at John F. Kennedy airport in New York, requires a dinner reservation at a vegetarian restaurant in "Cardiff by the Sea" near San Diego. It should be appreciated however, that a restaurant reservation service is but one type of service that the telephonic concierge service may be able to provide. Other areas of use may include, but are not limited to: information, reservation and ticketing for events, accommodation, transportation and travel, information regarding news, stock prices and weather, and providing access to other services such as grocery or flower delivery, etc.

As per the illustrative example, illustrated in FIGS. 11 and 12, the caller dials Directory Assistance (DA) (step 200). The caller is connected to an operator or a voice server (step 202). After a greeting, the caller is informed either by the voice server or by the operator about the telephonic conceierge service (step 204). At this point the concierge service may also be explained to the caller. The caller may already be aware of the concierge service and therefore can skip the introduction and/or explanation of the service (step 240).

If the caller is interested in using the concierge service, she can either request directory listing information (step 210) or directly make a reservation request (step 208). If the caller requests restaurant listing information at step 210 the operator prompts the caller (step 211) for details regarding for example the type of restaurant, the restaurant location, the approximate date and time of the reservation and other preferences like for example dietary requirements, smoking or non-smoking, outdoors or indoors etc. The operator then inputs these details into a caller profile database through server 134 (step 213). Using a search engine, the operator searches a directory listing database through server 136 (step 212) for restaurants based on the above-mentioned caller details and preferences. As per our example, a suitable restaurant is located in "Cardiff by the Sea," near San Diego.

If the caller knew the name of the restaurant she wanted she may make a specific reservation request (step 208) directly on connection to the operator. In such a case or as per our example, the operator then prompts the caller for reservation details (step 214) such as the restaurant name (if the operator did not locate it, supra), the callers name, a second choice of restaurant, a required reservation date and time, alternative times, contact details and any additional preferences such as smoking or non-smoking, type of credit card to be used, restaurant views, etc. These details are input into a browser type graphical user interface (GUI) as shown in FIG. 6. The reservation details are then stored in the caller profile database along with a reservation request or ticket. The operator then informs the caller that the reservation request is being processed and either reconnects the caller to the directory assistance operator or disconnects the caller from the system (step 236).

The ticket is automatically forwarded to a fulfillment agent (FA) (step 216) for processing. It should be noted that the operator may also process the ticket herself. By default, the ticket is automatically forwarded to a fulfillment agent at the directory assistance center where the call was received, in our example New York. The operator, fulfillment agent or an automated system at the directory assistance center will then forward the request to the directory assistance center nearest the requested venue. In the illustrative example the request will be forwarded to the San Diego directory assistance center. The fulfillment agent in San Diego thus automatically receives the reservation request (step 218), shown by the graphical user interface in FIGS. 7–10.

The fulfillment agent then attempts to contact the restaurant (step 220). Should the fulfillment agent be able to contact the restaurant he will attempt to make a reservation (step 222). The fulfillment agent then updates the status of the ticket (step 224) on the system irrespective of whether he was, in fact, successful in making the reservation or not, indicating last action performed, result, reservation details etc. (as seen in FIGS. 8 through 10). After each change of status the fulfillment agent or the system automatically sets a next action time for his attention sometime in the future. The request then slots into the appropriate place in a fulfillment queue. The fulfillment agent cannot set nonsensical time periods like zero minutes or two years. New tickets are prioritized so as to be dealt with in a timely manner on a first-in-first-out basis. After a set amount of unsuccessful tries, the fulfillment agent is automatically prompted to try the second restaurant choice.

After a set amount of time, say for example thirty minutes, the fulfillment agent retrieves the status of the request (step 228) and contacts the caller informing her of the status of her request (step 230). The fulfillment agent may contact the caller by phone, fax, email or pager. The caller may also call the service back before the caller is contacted by the fulfillment agent (step 226). The reservation status is retrieved from the system (step 228) and the caller is informed of the current status of the reservation request (step 230). If required, the operator or fulfillment agent may modify the reservation request (step 232) which is automatically reforwarded to the fulfillment agent (step 218). Once the reservation is made or the caller indicates a desire to cancel the request, the operator or fulfillment agent closes the Ticket and connects the caller to directory assistance or disconnects the caller from the system (step 236).

An important feature of the present invention is an activity logging function (step 234). All caller requests are logged in the caller profile database server, as depicted in FIG. 1 by numeral 134. The activity log helps with internal auditing and billing of that particular caller. On-demand printed reservation status reports may be provided to call center managers and/or supervisors. Furthermore when the caller makes use of the concierge service, her mobile identification number (MIN), caller details, most frequent requests and past request activity is automatically presented to the operator. The caller therefore will not have to resupply repetitive details to the operator, thus speeding up the process and reducing the operator's processing time. A fulfillment agent such as a supervisor who is not currently active, then handles any concierge requests that are active or open at that particular directory assistance center.

The system may generate reports such as the number of calls processed by a particular center or by the system as a whole. Other reports may include reports indicating the average time spent on each ticket, the time spent fulfilling a ticket request and the time taken to contact a customer.

The telephonic concierge system may be affected by other scenarios such as: the fulfillment agent may be unsuccessful in contacting the restaurant; the requested reservation time may be unavailable; the caller might cancel the request; the caller may request a change in the reservation time while still pending.

Additional features

The system and method of the present invention has been described. Clearly, there are still other alternatives and equivalents that are within the spirit and intent of the invention and will occur to a person skilled in the art. For example, without limitation, the system may also provide an automated notification to the fulfillment agent when time limits are being exceeded. The caller may receive automated delivery of recorded and/or text-to-speech notification of status of the reservation, with schedule of attempts followed until confirmation of receipt is received. The caller may be able to make periodic requests, such as for example the same restaurant reservation on the first Monday of each month. The caller may request a group notification, to inform a group of people of the reservation confirmation details. The caller may make a "type" request where for example all restaurants of a particular type are contacted, from the nearest to the farthest until the request can be fulfilled. The caller may make a group negotiation by making a group reservation and getting consensus from all parties.

Data extracted from the system may be used for internal reports. Such reports may indicate system usage information or service (a particular restaurant hotel, airline) usage information. This information may include the most popular service requests, for example the most popular restaurants, and may be used by fulfillment agents or operators to make recommendations. The data may also be utilized for other purposes such as marketing or market research.

Accordingly, it is intended that the scope of the invention be limited only by the claims that follow and all equivalents thereto.

What is claimed is:

1. A method for providing a concierge service from one or more directory assistance centers comprising:

receiving at a first directory assistance center a call from a caller, the call including a request for a concierge service relating to a desired product or service;

searching a database for data concerning a provider of the desired product or service in response to the request;

determining whether a second directory assistance center is closer to the provider of the desired product or service than the first directory assistance center, the second directory assistance center being unaffiliated with the provider of the desired product or service; and if it is determined that the second directory assistance center is closer to the provider of the desired product or service than the first directory assistance center, the first directory assistance center sending information regarding the request to the second directory assistance center, and a fulfillment agent at the second directory assistance center establishing a communication, separate from the call, with the provider of the desired product or service to fulfill the request based on the information.

2. The method of claim 1, wherein the communication includes a telephone call.

3. The method of claim 1, further comprising generating a ticket containing details of the request, wherein a field on the ticket representing which directory assistance center is to attempt to fulfill the request is populated by default with said first directory assistance center.

4. A method for providing a directory assistance service by a directory assistance provider comprising:

receiving a directory assistance call from a caller, the call including a request for suggestions of businesses which provide a desired product or service;

searching a database;

obtaining a list of selected businesses responsive to the request, wherein the selected businesses are ordered as a function of at least compensation given to the directory assistance provider by the selected businesses; and suggesting at least one of the selected businesses to the caller.

5. The method of claim 4, wherein businesses which provide the desired product or service and have given said at least compensation to the directory assistance provider will be suggested to the caller before businesses which provide the desired product or service and have not given said at least compensation to the directory assistance provider.

6. The method of claim 4, wherein said directory assistance provider comprises at least one operator.

7. The method of claim 4, wherein businesses which have given said at least compensation to the directory assistance provider are listed before businesses which have not given said at least compensation to the directory assistance provider.

8. The method of claim 4, further comprising connecting the caller to a business which has given said at least compensation to the directory assistance provider.

9. A method for providing concierge and directory assistance services composing:
receiving a call from a caller at a directory assistance center;
determining that the caller is requesting a concierge service, which relates to a desired product or service provided by a business; and
assigning a fulfillment agent to fulfill the concierge service request, wherein the fulfillment agent establishes a communication, separate from the call, with the business to fulfill the concierge service request.

10. The method of claim 9, further comprising directing the call to a directory assistance operator, wherein said assigning comprises assigning the directory assistance operator as the fulfillment agent.

11. The method of claim 9, further comprising providing the caller with a directory assistance service after receiving the caller's call.

12. The method of claim 11, wherein said directory assistance service comprises providing directions.

13. The method of claim 12, wherein the directions include driving directions.

14. The method of claim 11, wherein said directory assistance service comprises sending at least a telephone number to a messaging device.

15. The method of claim 14 wherein the messaging device includes a pager.

16. The method of claim 14 wherein the telephone number is sent in text message form.

17. The method of claim 14 wherein the caller is afforded an option to send the telephone number to the messaging device.

18. The method of claim 17 wherein the option is selectable by pressing at least one predetermined key on a communications device from which the call originates.

19. The method of claim 18 wherein the communications device incorporates the messaging device.

20. The method of claim 18 wherein the communications device includes a telephone.

21. The method of claim 20 wherein the telephone includes a wireless telephone.

22. A method for providing a concierge service to a user comprising:
receiving, from the user, a request for the concierge service;
performing an action, by a first agent, in attempt to fulfill the request;
updating a status of fulfillment of the request in a database based on the results of the last action performed;
setting a next action time in a database when further action relating to the request should be taken;
automatically notifying a second agent when said next action time has arrived; and
performing by said second agent a next action relating to said request upon arrival of said next action dine, the next action being selected from a plurality of next action options.

23. The method of claim 22, wherein said first agent and said second agent are the same agent.

24. The method of claim 22, wherein said first agent and said second agent are different agents.

25. The method of claim 22, wherein said next action time is set automatically.

26. The method of claim 22, wherein said request relates to the caller's desire to visit an establishment, and wherein said next action time relates to the time at which the caller wishes to visit the establishment.

27. The method of claim 22, further comprising displaying the next action options for the second agent on a computer interface.

28. The method of claim 27, further comprising automatically performing steps towards completing the next action selected by the second agent.

29. The method of claim 28, wherein said steps towards completing the next action comprise looking up in a database a phone number of an establishment the caller wishes to visit and dialing the phone number.

30. The method of claim 22, wherein said request is accorded a priority.

31. The method of claim 30, wherein the order in which the request is attempted to be fulfilled is a function of its priority.

32. The method of claim 30, wherein which agent attempts to fulfill the request is a function of its priority.

* * * * *